(12) United States Patent
Cardei et al.

(10) Patent No.: US 7,460,549 B1
(45) Date of Patent: Dec. 2, 2008

(54) RESOURCE MANAGEMENT FOR AD HOC WIRELESS NETWORKS WITH CLUSTER ORGANIZATIONS

(75) Inventors: Ionut E. Cardei, Boca Raton, FL (US); Allalaghatta Pavan, Minneapolis, MN (US); Srivatsan Varadarajan, Minneapolis, MN (US); Lee B. Graba, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 685 days.

(21) Appl. No.: 10/872,257

(22) Filed: Jun. 18, 2004

(51) Int. Cl.
*H04L 12/28* (2006.01)
(52) U.S. Cl. ............... 370/408; 370/310.1; 370/338
(58) Field of Classification Search .......... 370/338, 370/310.1, 408
See application file for complete search history.

(56) References Cited

U.S. PATENT DOCUMENTS

| | | | |
|---|---|---|---|
| 5,754,959 A | * | 5/1998 | Ueno et al. ............... 455/453 |
| 6,718,394 B2 | | 4/2004 | Cain |
| 2005/0240928 A1 | * | 10/2005 | Brown et al. ............... 718/100 |

OTHER PUBLICATIONS

Duran-Limon H. A. et al., "A resource and QoS management framework for a real-time event system in mobile ad hoc environments," Processing, Ninth IEE International Workshop on Object-Oriented Real-Time Dependable Systems, IEEE Comput Soc. Los Alamitos, CA USA, 2003, pp. 217-224, XP010783612, ISBN: 0-7695-2054-5.
Zhang J. et al., "Task-oriented self-organization of ad hoc sensor systems," Proceedings of IEEE Sensors 2002. Orlando, FL, Jun. 12-14, 2002, IEEE International Conference on Sensors, New York, NY: IEEE, US, vol. 1 of 2, Conf. 1, Jun. 12, 2002 pp. 1485-1490, XP010605341, ISBN: 0-7803-7454-1.
Estrin D. et al, "Next Century Challenges: Scalable Coordination in Sensor Networks," Mobicom '99. Proceedings of the 5th Annual ACM/IEEE International Conference on Mobile Computing and Networking. Seattle, WA, Aug. 15-20, 1999, Annual ACM/IEEE Itnernational Conference on Mobile Computing and Networking, New York, NY, pp. 263-270, CP000896093, ISGN 1-58113-142-9.

\* cited by examiner

*Primary Examiner*—Duc Nguyen
*Assistant Examiner*—Wayne Cai
(74) *Attorney, Agent, or Firm*—McDonnell Boehnen Hulbert & Berghoff LLP

(57) ABSTRACT

An initiator node in a local cluster included in a wireless network receives an admission request to execute an application comprising a set of tasks. If the initiator node is unable to map the set of tasks to nodes included in the local cluster, the local cluster head node forwards the admission request to the cluster head node of successive clusters in the wireless network in order to have at least one node in each of the successive clusters send resource availability information to the initiator node. The initiator node attempts to map the set of tasks to a subset of the nodes from which resource availability information has been received. This is repeated until the initiator node is able to map the set of tasks to a subset of the nodes in the wireless network or until there are no additional clusters to forward the admission request to.

31 Claims, 14 Drawing Sheets

RESOURCE MANAGEMENT FOR AD HOC WIRELESS NETWORKS WITH CLUSTER ORGANIZATIONS

GOVERNMENT LICENSE RIGHTS

The U.S. Government has a paid-up license in this invention and the right in limited circumstances to require the patent owner to license others on reasonable terms as provided for by the terms of Contract No. N00014-01-C-0031 awarded by the Department of the Navy.

TECHNICAL FIELD

The following description relates to telecommunications in general and to providing quality of service in a wireless network in particular.

BACKGROUND

One type of telecommunication network is a wireless network. In a wireless network, two or more devices communicate over a wireless communication link (for example, over a radio frequency (RF) communication link). In one wireless network topology, one or more remote nodes communicate with a central node (also referred to here as a "base station") over respective wireless communication links. In such a topology, pre-existing network infrastructure is typically provided. In one example, a network of base stations, each of which is coupled to one or more wired networks, is provided. In such a topology, the remote nodes typically do not communicate with one another directly. One example of such a network is a cellular telephone network.

In another wireless network topology (referred to here as "ad hoc"), no predetermined infrastructure is provided. Typically, an ad hoc network is made up of a dynamic group of nodes that communicate over wireless communication links. Because wireless communication links used in ad hoc wireless networks are typically prone to a large variation in quality, providing quality of service (QOS) is important in applications that have demanding availability, bandwidth, and delay requirements. Examples of such applications include real-time and mission critical applications such as search and rescue, wireless multimedia, command and control, and combat support systems.

SUMMARY

In one embodiment, a system includes a wireless network comprising a plurality of clusters. Each cluster comprises a set of nodes including a cluster head node. Each node includes at least one resource. When an initiator node in a local cluster included in the wireless network receives an admission request to execute an application comprising a set of tasks, the initiator node forwards the admission request to a local cluster head node for the local cluster. When the admission request is forwarded to the local cluster head node, the local cluster head node requests that at least one of the set of nodes included in the local cluster provide resource availability information to the initiator node. The initiator node attempts to map the set of tasks to a subset of the nodes included in the local cluster using the resource availability information received from nodes in the local cluster. If the initiator node is unable to map the set of tasks to the subset of nodes included in the local cluster, the local cluster head node forwards the admission request to the cluster head node of successive clusters in the wireless network in order to have at least one node in each of the successive clusters send resource availability information to the initiator node until the initiator node is able to map the set of tasks to a subset of the nodes in the wireless network or until there are no additional clusters to forward the admission request to. The initiator node attempts to map the set of tasks to a subset of the nodes from which resource availability information has been received.

In another embodiment, a method includes attempting to map a set of tasks to at least one node within a first cluster of the wireless network based on resource availability of the nodes within the first cluster. The wireless network has a plurality of clusters. Each cluster includes at least one of a plurality of nodes. The method further includes, if unable to map the set of tasks to said at least one node in the first cluster, attempting to map the set of tasks to at least one node in at least one of the first cluster and at least one of the other clusters in the wireless network based on resource availability of the nodes within the first cluster and the at least one of the other clusters in the wireless network.

In another embodiment, a system includes a wireless network comprising a plurality of clusters. Each cluster includes a set of nodes including a cluster head node. Each node includes at least one resource. When an initiator node in a local cluster included in the wireless network receives an admission request to execute an application comprising a set of tasks, the initiator node forwards the admission request to a local cluster head node for the local cluster. When the admission request is forwarded to the local cluster head node, the local cluster head node requests that at least one of the set of nodes included in the local cluster provide resource availability information to the initiator node. The initiator node attempts to map the set of tasks to a subset of the nodes included in the local cluster using the resource availability received from nodes in the local cluster. If the initiator node is unable to map the set of tasks to the subset of nodes included in the local cluster, the initiator node requests that the local cluster head node forward the admission request to at least one remote cluster head node of at least one remote cluster included in the wireless network. When the admission request is forwarded to the at least one remote cluster head node, the at least one remote cluster head node requests that at least one of the set of nodes included in the at least one remote cluster provide resource availability information to the initiator node. The initiator node attempts to map the set of tasks to a subset of the nodes included in at least one of the local cluster and the at least one remote cluster using the resource availability received from nodes in the local cluster and the at least one remote cluster.

In another embodiment, a first node includes a wireless transceiver to send and receive data over a wireless network, a processor in communication with the wireless transceiver, and a tangible medium, in communication with the processor, in which program instructions are embodied. The program instructions, when executed by the processor, cause the first node to receive an admission request from a client. The admission request requesting that a set of tasks be executed. The program instructions, when executed by the processor, cause the first node to forward the admission request to a local cluster head node for a local cluster in order to have at least one node in the local cluster send resource availability information to the first node. The first node is a member of the local cluster. The program instructions, when executed by the processor, cause the first node to receive resource availability information from the at least one node in the local cluster and attempt to map the set of tasks to at least a subset of the nodes included in the local cluster using the resource availability information received from the at least one node in the local cluster. The program instructions, when executed by the processor, cause the first node to, if unable to map the set of tasks to the subset of nodes included in the local cluster, request that the local cluster head node of the local cluster forward the admission request to at least one remote cluster head node of at least one remote cluster included in the wireless network in order to have at least one node in the at least one remote cluster send resource availability information to the first node. The program instructions, when executed by the processor, cause the first node to, if unable to map the set of tasks to the subset of nodes included in the local cluster, attempt to map the set of tasks to at least a subset of the nodes included in at least one of the local cluster and the at least one remote cluster using the resource availability received from the at least one node in at least one of the local cluster and the at least one remote cluster.

In another embodiment, software embodied on a tangible medium readable by a programmable processor included in a first node of a wireless network. The wireless network includes a plurality of clusters. The software includes program instructions executable on at least one programmable processor included in the first node. The program instructions are operable to cause the first node to receive an admission request from a client, the admission request requesting that a set of tasks be executed. The program instructions are operable to cause the first node to forward the admission request to a local cluster head node for the local cluster in order to have at least one node in the local cluster send resource availability information to the first node. The first node is a member of the local cluster. The program instructions are operable to cause the first node to receive resource availability information from the at least one node in the local cluster and attempt to map the set of tasks to at least a subset of the nodes included in the local cluster using the resource availability information received from the at least one node in the local cluster. The program instructions are operable to cause the first node to, if unable to map the set of tasks to the subset of nodes included in the local cluster, request that the local cluster head node of the local cluster forward the admission request to at least one remote cluster head node of at least one remote cluster included in the wireless network in order to have at least one node in the at least one remote cluster send resource availability information to the first node. The program instructions are operable to cause the first node to, if unable to map the set of tasks to the subset of nodes included in the local cluster, attempt to map the set of tasks to at least a subset of the nodes included in at least one of the first cluster and the at least one remote cluster using the resource availability received from received from the at least one node in at least one of the first cluster and the at least one remote cluster.

In another embodiment, a first node includes means for sending and receiving data over a wireless network, means for receiving an admission request from a client, the admission request requesting that a set of tasks be executed, and means for forwarding the admission request to a local cluster head node for a local cluster in order to have at least one node in the local cluster send resource availability information to the first node. The first node is a member of the local cluster. The first node further includes means for receiving resource availability information from the at least one node in the local cluster and means for attempting to map the set of tasks to at least a subset of the nodes included in the local cluster using the resource availability information received from the at least one node in the local cluster. The first node further includes means for requesting that the local cluster head node of the local cluster forward the admission request to at least one remote cluster head node of at least one remote cluster included in the wireless network in order to have at least one node in the at least one remote cluster send resource availability information to the first node, if unable to map the set of tasks to the subset of nodes included in the local cluster. The first node further includes means for attempting to map the set of tasks to at least a subset of the nodes included in at least one of the local cluster and the at least one remote cluster using the resource availability received from the at least one node in at least one of the local cluster and the at least one remote cluster, if unable to map the set of tasks to the subset of nodes included in the local cluster.

The details of one or more embodiments of the claimed invention are set forth in the accompanying drawings and the description below. Other features and advantages will become apparent from the description, the drawings, and the claims.

DRAWINGS

FIGS. 4A-4B, 5A-5B, and 6A-6B are flow diagrams of one embodiment of methods of admitting a distributed application in an ad hoc wireless network having a cluster topology.

FIGS. 7A-7F are block diagrams illustrating the operation of the embodiment of the application admission protocol shown in FIGS. 4A-4B, 5A-5B, and 6A-6B.

Figure 8:
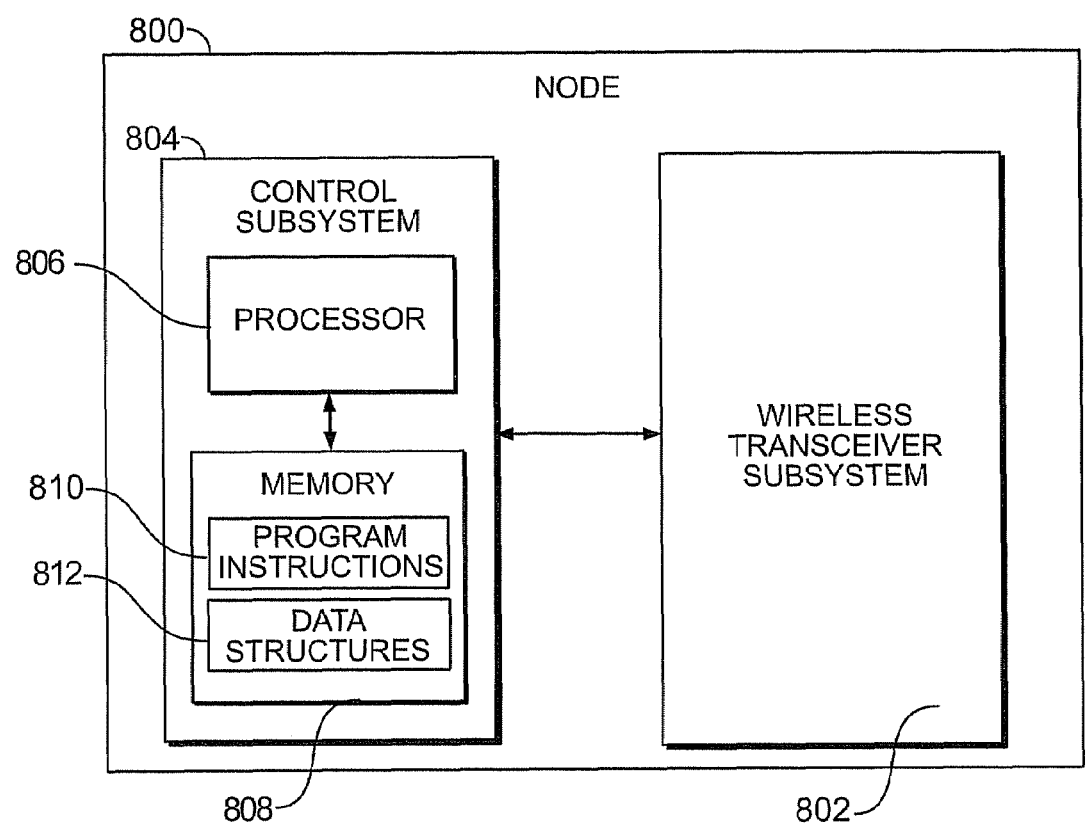

FIG. 8 is a simplified block diagram of one embodiment of a node.

Like reference numbers and designations in the various drawings indicate like elements.

DETAILED DESCRIPTION

Figure 1:
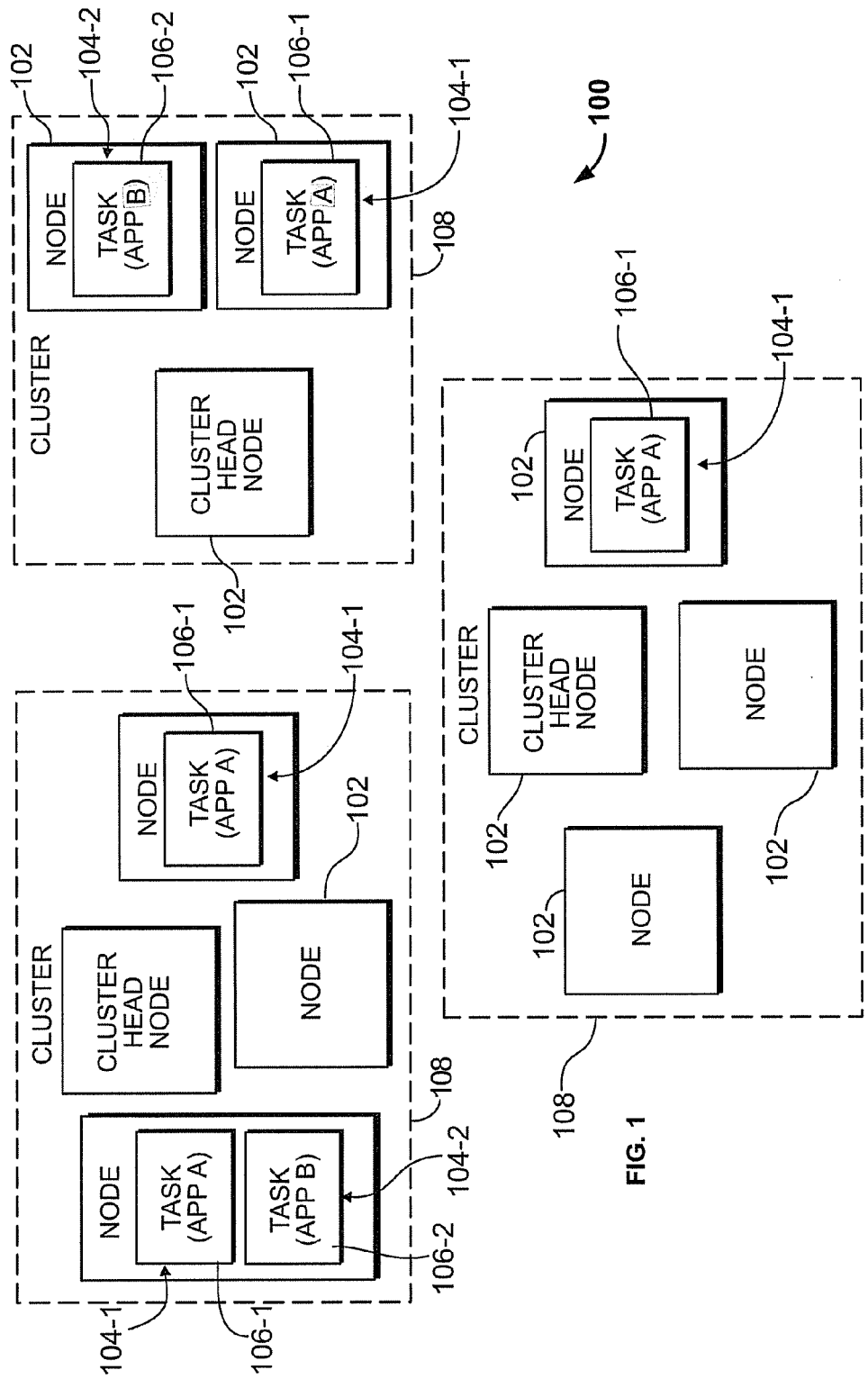
FIG. 1 is a block diagram of one exemplary embodiment of an ad hoc wireless network.

FIG. 1 is a block diagram of one exemplary embodiment of an ad hoc wireless network 100. In one implementation of such an embodiment, network 100 is a mobile ad hoc wireless network 100 (also referred to here as a "MANET"). Network 100 is an ad hoc wireless network that includes a dynamic set of nodes 102. Over time, various nodes typically will join and leave the network.

In the embodiment shown in FIG. 1, the nodes 102 are organized in clusters 108. One of the nodes 102 in each cluster is designated as the "cluster head" node 102. In one implementation, the clusters 108 are formed based on traffic locality and node mobility. In another implementation, the clusters 108 are formed based on logical membership and mobility patterns. In the embodiment shown in FIG. 1, the cost of communication within a cluster is typically lower than between clusters, though in other embodiments this is not necessarily the case.

In the embodiment shown in FIG. 1, one or more distributed applications 104 are executed by the nodes 102. Two distributed applications 104-1 and 104-2, respectively, are shown in FIG. 1. Each distributed application 104 comprises one or more tasks 106 that are executed by a subset of the nodes 102 in the network 100. In FIG. 1, the distributed applications 104-1 and 104-2 comprise tasks 106-1 and tasks 106-2, respectively.

Each distributed application 104 uses various resources in the course of being executed. In the embodiment shown in FIG. 1, one type of resource is provided by, and is characterized relative to, a single node 102. This type of resource is referred to here as a "node resource." Examples of node resources include processing time, memory usage, and energy. Another type of resource is characterized relative to a pair of nodes 102 and is referred to here as a "network resource." Network bandwidth between two nodes 102 is one example of a network resource and is specified as a source-destination pair.

Figure 2:
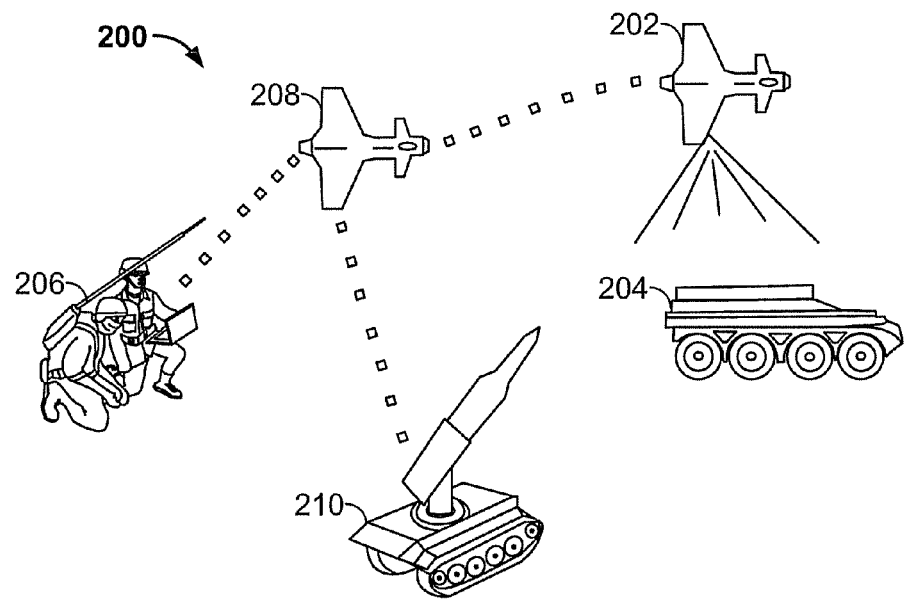
FIG. 2 is a block diagram of one embodiment of a combat support system.

In one implementation, network 100 supports periodic distributed applications 104 with a pipeline topology comprising a chain of communication tasks. One example of such a distributed application 104 is illustrated in FIG. 2. FIG. 2 is a block diagram of one embodiment of a combat support system 200. An ad hoc wireless network is used to link the various devices (that is, nodes) that are included in the network. A first unmanned air vehicle 202 (for example, a PREDATOR drone) monitors an enemy target 204. The first unmanned air vehicle 202 delivers real-time (that is, time-critical data) surveillance data (for example, high data rate video and/or infrared data) to a fire control terminal 206 operated by one or more soldiers.

The first unmanned air vehicle 202 delivers real-time (that is, time-critical data) surveillance data (for example, high data rate video and/or infrared data) to a fire control terminal 206 operated by one or more soldiers. In the embodiment shown in FIG. 2, the surveillance data from the first unmanned air vehicle 202 is routed to the fire control terminal 206 via a second unmanned air vehicle 208.

The fire control terminal 206, in such an embodiment, is used to control a weapon 210 (for example, to fire HOWITZER at the enemy target 204). Such control information is time-critical. Control information from the fire control terminal 206 is routed to the weapon 210 via the second unmanned air vehicle 208. This type of mission-critical application demands strict limits on end-to-end latency and requires significant bandwidth for network connections. Embodiments of the methods, devices, and systems described here are suitable for use in such an embodiment, though it is to be understood that such methods, devices, and systems are suitable for use with other types of applications and networks.

Figure 3:
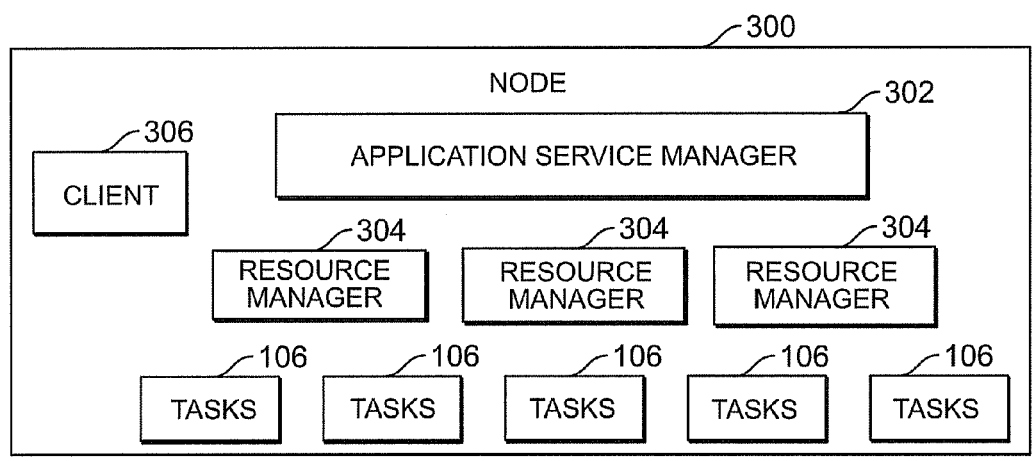
FIG. 3 is a block diagram illustrating one embodiment of a system for resource management.

FIG. 3 is a block diagram illustrating one embodiment of a system 300 for resource management. The embodiment of system 300 is described here as being implemented on each of the nodes 102 of the wireless network 100 of FIG. 1, though it is to be understood that other embodiments of system 300 are implemented in other ways and/or using other networks 100. The system 300 includes an application service manager 302 and one or more resource managers 304. Each of the resource managers 304 manages one or more resources available to an application 304 executing on the node 102. Resources that are available to the node 102 include, for example, node resources such as CPUs, memory, storage, energy and network resources such as buffers and communication bandwidth. In one implementation of such an embodiment, all the resource managers 304 export a common interface for admission, adaptation and feedback adaptation that allows resource managers 304 for different resources and/or policies to be "plugged in" the system 300 relatively simply.

For example, in the embodiment shown in FIG. 3, the system 300 includes a resource manager that manages CPU load available at that node 102. This resource manager is also referred to here as the "CPU resource manager" 304. The CPU resource manager 304 administers the local (that is, local relative to the node 102) CPU resource. In one implementation of such an embodiment, the CPU resource manager 304, based on the current CPU resource allocation for the node 102, builds a process scheduler and controls the utilization of the CPU for the node 102 by applications 104 (and the tasks 106 comprising such applications 106) executing on that node 102. In such an implementation, the CPU resource manager 304 is implemented as a middleware layer wrapped on top of the local scheduler of the operating system executing on the node 102. In another implementation, the CPU resource manager 304 implements a real-time scheduling policy, such as the rate monotonic algorithm (RMA).

As shown in FIG. 3, the system 300 also includes a resource manager that controls communication bandwidth and delay. This resource managers is also referred to here as the "network resource manager" 304. The network resource manager 304 controls bandwidth allocation, enforces traffic shaping and extracts network topology from the routing layer. The embodiment of an admission protocol described below in connection with FIGS. 4A-4B, 5, 6, and 7 works in cooperation with a cluster-based ad hoc routing protocol. In one embodiment, nodes 102 are organized in clusters 108 where the cost of communication within a cluster 108 may be lower than between clusters 108. The application admission protocol described below in connection with FIGS. 4A-4B, 5A-5B, and 6A-6B attempts to improve admission quality by decreasing cost of communication based on the assumption that communication in a MANET is less reliable while processing resources are plentiful.

The application service manager 302 is responsible for the end-to-end resource management for each distributed application. The application service manager 302 handles end-to-end QoS negotiation, admission, and adaptation by breaking end-to-end requests into individual contracts for basic resources that are passed to the appropriate resource managers 304 and to other application service managers 302 executing on other nodes 102 in the network 100. Application service managers 302 receive admission requests from clients 306. Clients 306, as used here, include users, applications 104, or other application service managers 302 executing on other nodes 102 in the network 100.

Each admission request for a particular distributed application comprises a minimum and maximum range of acceptable QoS (CPU load, network bandwidth) for the tasks 106 of that particular application 104. In one implementation, the distributed applications 104 comprise distributed periodic tasks 106 that are connected (that is, communicate) in a pipeline topology. Depending on resource availability, tasks 106 from the same application 104 may be mapped to and executed on the same node 102, on different nodes 102 in the same cluster, or on nodes 102 from different clusters. Typically, each case incurs an increasing cost of intra-application communication.

During operation of such an embodiment, it may be the case that some application tasks 106 must be admitted on a specific node 102 or on a node 102 that is close to a particular geographical location and/or physical item. One example is shown in FIG. 2. An application 104 that performs automatic target recognition of the target 204 requires that a sensor task run on the first unmanned air vehicle 202, which includes an imaging and/or infra-red sensor. A target display task is run on the fire control terminal 206. Intermediary processing and recognition tasks, however, can be allocated on any node 102 in the network with necessary and sufficient resources.

In one implementation, such task constraints are addressed by defining special resources appropriate to the particular constraint. In the previous example, a "sensor" resource and "target display" resource are defined. In such an implementation, the first unmanned air vehicle 202 executes a sensor resource manager 304 that manages access to the sensor resource available on the first unmanned air vehicle 202. The fire control terminal 206 executes a target display resource manager that manages access to the target display resource available on the fire control terminal 206. Application service managers 302 in the network 100 match requests made by tasks 106 for the sensor resource and the target display resource to the sensor resource manager 304 and the target display resource manager 304, respectively, as appropriate. Moreover, in other implementations, the system 300 is adapted to account for general location constraints by preloading a matrix X (described below), which defines the task mapping, with $x_{ij}$ values reflecting a desired mapping of a particular task i onto a particular node j.

FIGS. 4A-4B, 5A-5B, and 6A-6B are flow diagrams of one embodiment of methods 400, 500, and 600, respectively, of admitting a distributed application in an ad hoc wireless network having a cluster topology. The embodiments of method 400, 500, and 600 are described here as being implemented using the embodiment of network 100 shown in FIG. 1 and the embodiment of system 300 shown in FIG. 3, though it is to be understood that other embodiments are implemented in other ways.

Figure 4A:
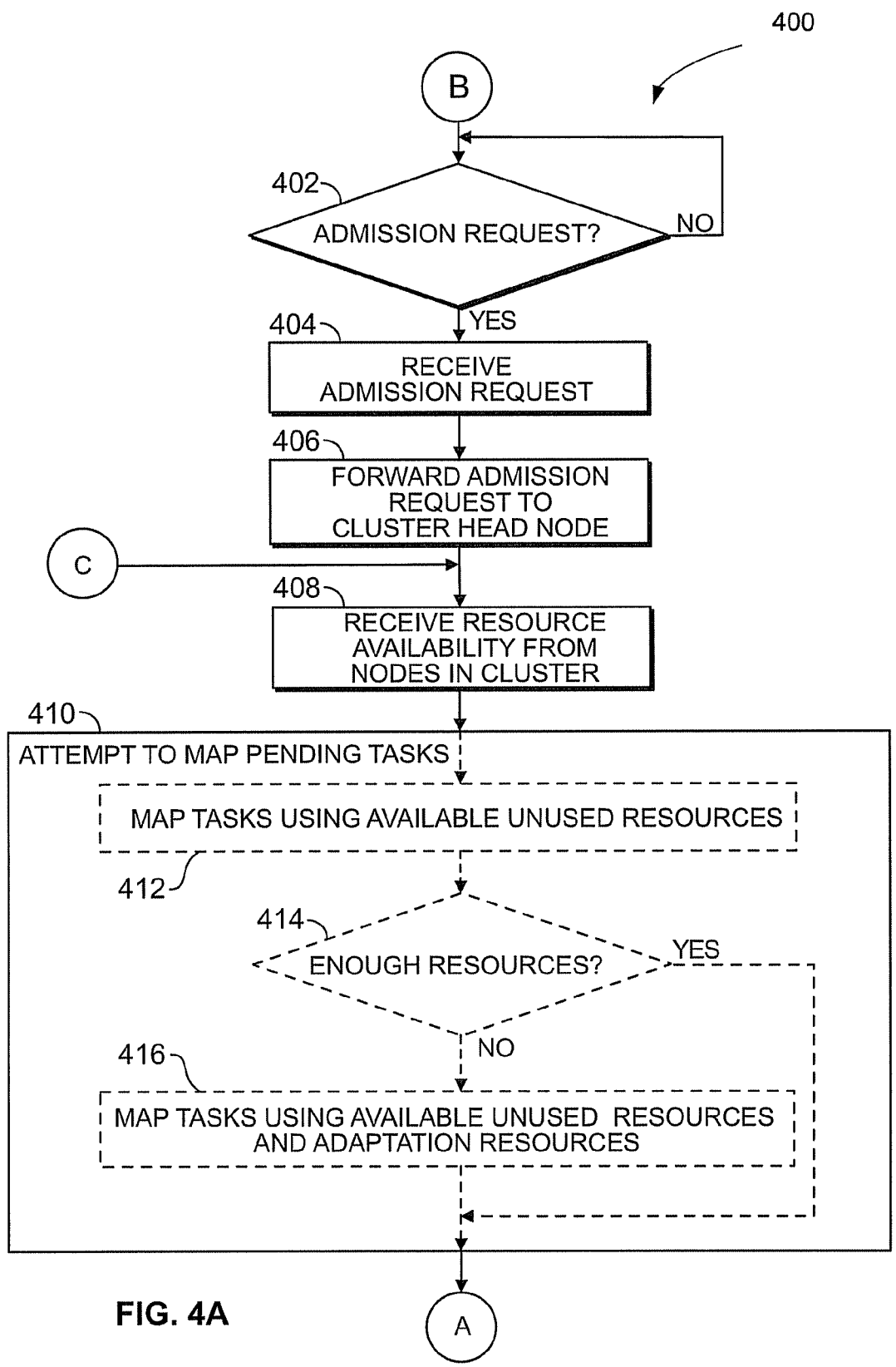
Figure 4B:
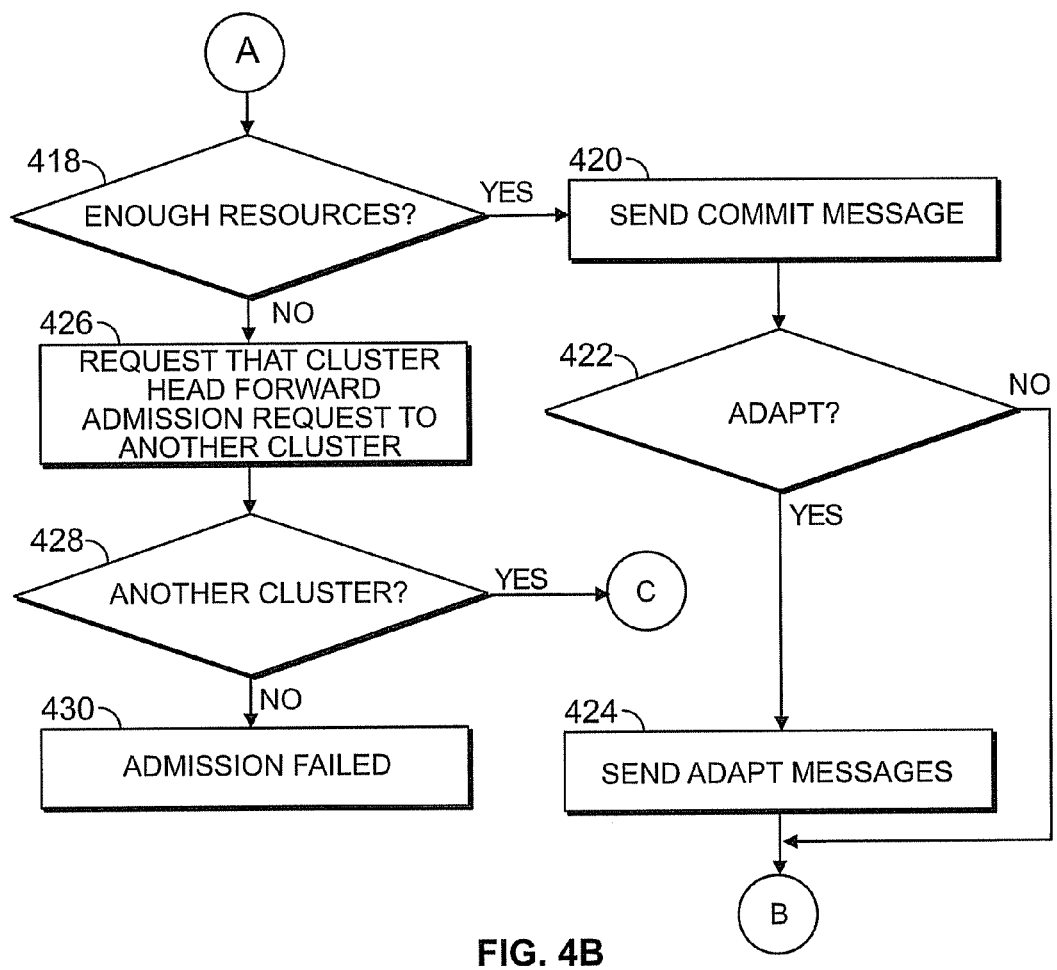

The embodiment of method 400 shown in FIGS. 4A-4B is performed by an application service manager 302. The application service manager 302 listens for an admission request sent from a client 306 executing on the same node 102 as the ASM 302 (block 402). The admission request indicates that the client 306 wishes to have a distributed application 104 admitted and executed on one or more nodes 102 in the network 100. When an admission request is sent to an application service manager 302, the application service manager 302 receives the admission request (block 404).

The client 306 that sends the admission request is referred to here as the "initiator client." The admission request is received by the application service manger 302 executing on the same node 102 as the initiator client 306. The receiving application service manager 302 is also referred to here as the "initiator application service manager" or "initiator ASM." The node 102 on which the initiator client 306 and the initiator ASM 302 are executing is referred to here as the "initiator node 102." Also, the cluster 108 that the initiator node 102 is a member of is referred to here as the "local cluster 108." The cluster head node 102 of the local cluster 108 is referred to here as the "local cluster head node" or "local cluster head." In one embodiment, the admission request identifies the distributed application 104 that the client 306 wishes to have admitted (which is also referred to here as the "pending application"), the tasks 106 that comprise the distributed application 104 (which are also referred to here as the "pending tasks"), and minimum and maximum resource allocations for each resource that is needed by the pending tasks 106.

The initiator ASM forwards the admission request on to the local cluster head node 102 (block 406). The initiator ASM 302 forwards the admission request to the local cluster head node 102. The cluster head node 404 receives the admission request and forwards the admission request on to each of the nodes 102 in the local cluster 108. Such forwarding is done in accordance with the underlying routing protocol used in the network 100. The nodes 102 in the local cluster 108 are also referred to here as the "local nodes" 102. The cluster head node 102 to which the admission request was most recently forwarded is also referred to here as the "current cluster head node." The cluster associated with the current cluster node is also referred to here as the "current cluster." For example when the admission request is forwarded to the local cluster head node 102, the local cluster head node 102 is the current cluster head node 102 and the local cluster 108 is the current cluster.

As described below in connection with FIG. 6A, each of the nodes 102 that receives an admission message and, in response, sends a message to or otherwise informs the initiator ASM 302 of the resource availability of that node 102. In one embodiment, this process also includes the initiator ASM 102 obtaining the resource availability for the initiator node 102 but not from the current cluster head node 102. In another embodiment, the current cluster head node 102 does provide its resource availability to the initiator ASM 302.

As described below in connection with FIG. 6A, in the embodiment shown in FIGS. 4A-4B, 5A-5B, and 6A-6B the resource availability for a given node includes two parts—the unused resource availability and the adaptation resource availability. The unused resource availability of a given resource for a given node 102 includes the amount of that resource that is not currently being used by any task 106 executing on the particular node 102. The adaptability resource availability of a given resource for a given node includes the amount of that resource that could be freed up by having one or more tasks adapt (that is, lower) their resource utilization of that resource.

After the initiator ASM 302 has received the resource availability from the nodes 102 in the current cluster (block 408), the initiator ASM 302 attempts to map the pending tasks to one or more nodes from which resource availability has been received (block 410). In one implementation, the initiator ASM 302 attempts to map the pending tasks after either the initiator ASM 302 has received the resource availability from all of the nodes 102 in the current cluster 108 or a predetermined timeout period has elapsed.

In one implementation (shown in FIG. 4 using dashed lines), a greedy admission process is used to map the pending tasks to one or more nodes 102 from which resource availability has been received. The greedy admission process uses the resource availability of each node 102 that provided resource availability information.

In this implementation, during the greedy admission process, the initiator ASM 302 attempts to map the pending tasks 106 to the nodes 102 from which resource availability has been received based on the unused resource availability of each such node 102 using a best fit/first fit algorithm (block 412). The best fit/first fit algorithm attempts to map as many of the pending tasks 106 as possible on one node 102. If the greedy admission process does not result in enough resources being provided to the pending application 104 (checked in block 414), then the initiator ASM 302 attempts to map the pending tasks 106 to the nodes 102 from which resource availability has been received based on the unused resource availability and adaptation resource availability of such nodes 102 (block 416). A best fit/first fit algorithm that attempts to fit as many of the pending tasks 106 on one node 102 as possible is used. The initiator ASM 302 attempts to map the pending tasks 106 using the adaptation resource availability by determining if the pending tasks 104 can be admitted by reducing the resource utilization of one or more tasks 106 executing on one or more nodes 102 that have previously been admitted and are already executing at the time the mapping process occurs. A task 106 that should have its resource utilization lowered is referred to here as an "adapted task" 106. A distributed application 104 that comprises at least one adapted task 106 is also referred to here as an "adapted application" 104.

If there are enough available resources to admit the pending application (checked in block 418 of FIG. 4B), the initiator ASM 302 sends a commit message to each node 102 having at least one pending task 106 mapped to that node 102 for execution thereon (block 420). In one implementation, the commit message that is sent to each node 102 informs the node 102 which of the pending tasks 106 are to be executed on that node 102. In such an implementation, the commit message also indicates, for each pending task 106 to be executed on that node 102, the amount of each resource that should be used by that task 106. Also, the commit message indicates which, if any, of the tasks 106 currently running on that node 102 must be adapted and how they should be adapted (for example, by indicating which resources to reduce the utilization of and by how much).

As is described below in connection with FIG. 6A, the nodes 102 that receive the commit messages "commit" the resources identified in the commit message to the pending tasks 106 identified in the commit message.

When adaptation is required to admit a distributed application 104 (checked in block 422), the initiator ASM 302 sends an adapt message to the other nodes 102 on which the distributed application 104 executes that have not received a commit message (block 424). Those nodes 102 that do not receive a commit message and on which the distributed application 104 execute need to be informed that the distributed application 104 has been adapted. When such a node 102 receives an adapt message, the node 102 is able to adjust the resource utilization for the distributed application 104 and notify its tasks, if appropriate. The resource utilization for the adapted application 104 on that receiving node 102 is adjusted to be compatible with the application resource utilization on the other nodes 102 on which the application 104 executes (for example, as described below in connection with FIG. 6B).

If there are not enough available resources to admit the pending application (checked in block 418), the initiator ASM 302 requests that the local cluster head 102 forward the admission request on to another cluster 108 in the network 100 to check for resource availability (block 426). Such other cluster 108 is referred to here as a "remote cluster." If there is no other remote cluster 108 left in the network 100 to check for resource availability (for example, when all the remote clusters 108 in the network 100 have previously been checked) (checked in block 428), the pending application 104 is not admitted for execution in the network 100 (block 430). This fact is communicated by the initiator client 306 to the initiator client 306.

If there is at least one other remote cluster 108 in the network left to check for resource availability, the local cluster head 102 selects one such remote cluster 108 and forwards the admission request to the cluster head node 102 of the selected remote cluster 108 as described below in connection with FIG. 5B.

The cluster head node 102 for the selected remote cluster 108 receives the admission request and forwards the admission request on to each of the nodes 102 in the selected remote cluster 108. The admission request is forwarded in accordance with the underlying routing protocol used in the network 100. As described below in connection with FIGS. 5A-5B, and 6A-6B, each node 102 in the remote cluster 108 sends a message to or otherwise informs the initiator ASM 302 of the resource availability for that node 102.

Method 400 then loops back to block 408, where the initiator ASM 302 receives the resource availability information communicated from the nodes 102 in the current cluster 108 and attempts to map the pending tasks to one or more nodes from which resource availability has been received (for example, the local nodes 102 and the nodes in the selected remote cluster 108). Such processing is repeated until the initiator ASM 302 has located sufficient resources to admit the pending application 104 or until the resource availability of all clusters 108 in the network 100 have been checked.

Figure 5A:
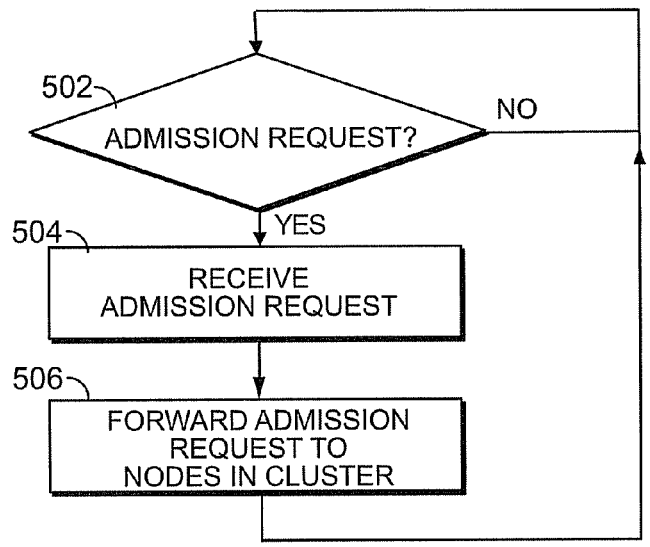
Figure 5B:
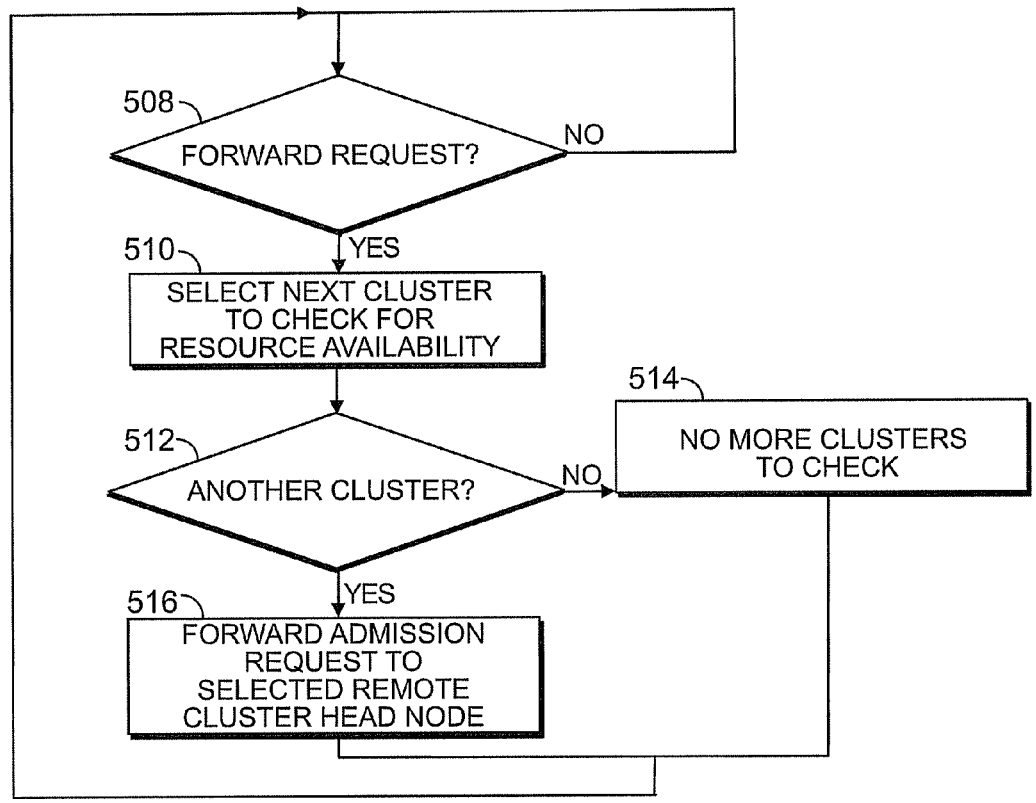

FIGS. 5A-5B are flow diagrams of a method 500 forwarding admission requests on to nodes 102 in a cluster. The embodiment of method 500 shown in FIGS. 5A-5B is performed by an application service manager 302 executing on a cluster head node 102 in the network 100. When an admission request is sent to the cluster head node 102 (checked in block 502 of FIG. 5A), the cluster head node 102 receives the admission request (block 504) and forwards the admission request on to the nodes 102 in the cluster 108 of which the cluster head node 102 is a member (block 506). For example, when the local cluster head node 102 receives an admission request from an initiator ASM 302 executing on the initiator node 102 in the local cluster 108, the local cluster head node 102 forwards the admission request on to the local nodes 102 in the local cluster 108.

Each cluster head node 102 also listens for a request from an initiator ASM 302 to forward the admission request on to another cluster 108 in the network 100 (block 508 shown in FIG. 5B). When the cluster head node 102 receives such a request, the cluster head node 102 is acting as the local cluster head node 102 for the initiator node 102 that sent the request. The initiator ASM 302 makes such a request when the resources available from the nodes 102 in the local cluster 108 are not sufficient to admit the pending application 104. The local cluster head node 102 selects another cluster 108 to check for resource availability (block 510). Such other clusters 108 are referred to here as "remote clusters" 108. The local cluster head node 102 selects a remote cluster 108 that has not previously has its resource availability checked for that particular admission request. In one embodiment, each cluster head node 102 maintains a "preference list" that identifies the list of remote clusters 108 in the network 100. The local cluster head node 102 selects the remote cluster 108 to check next using, for example, a round-robin policy. If there are no other remote clusters 108 left to check for resource availability for that particular admission request (for example, when all the remote clusters 108 in the network 100 have previously been checked) (checked in block 512), the local cluster head node 102 communicates that fact to the initiator node 102 (block 514).

If there is another remote cluster 108 to check, the local cluster head node 102 forwards the admission request on to the cluster head node 102 of the selected remote cluster 108 (block 516). The cluster head node 102 of the selected remote cluster 108, as described above in connection with blocks 502 through 506, receives the admission request and forwards the admission request to the nodes 102 in the selected remote cluster 108. The nodes 102 in the selected remote cluster 108 communicate their resource availability to the initiator node 102 in response to the admission request.

Figure 6A:
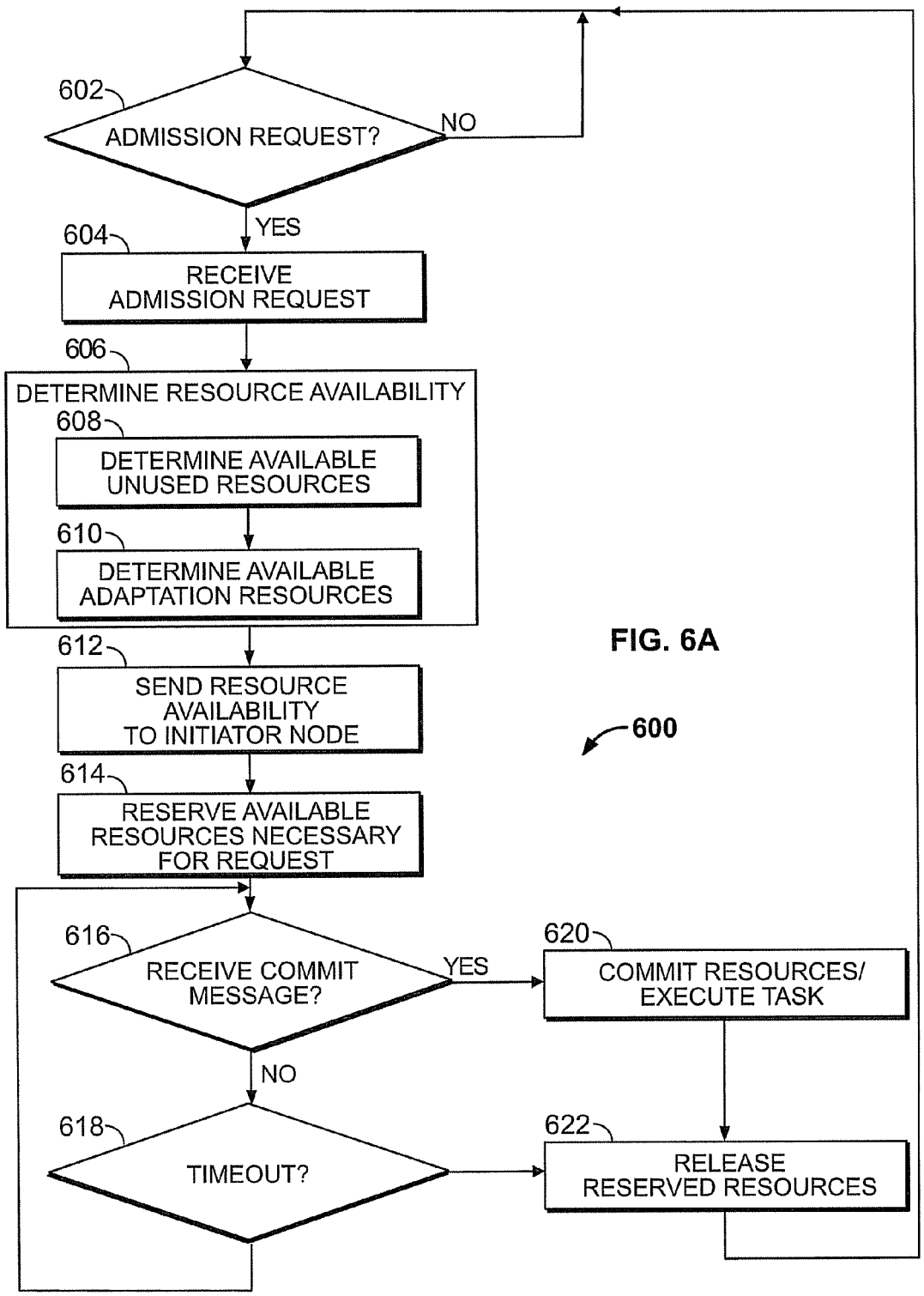
Figure 6B:
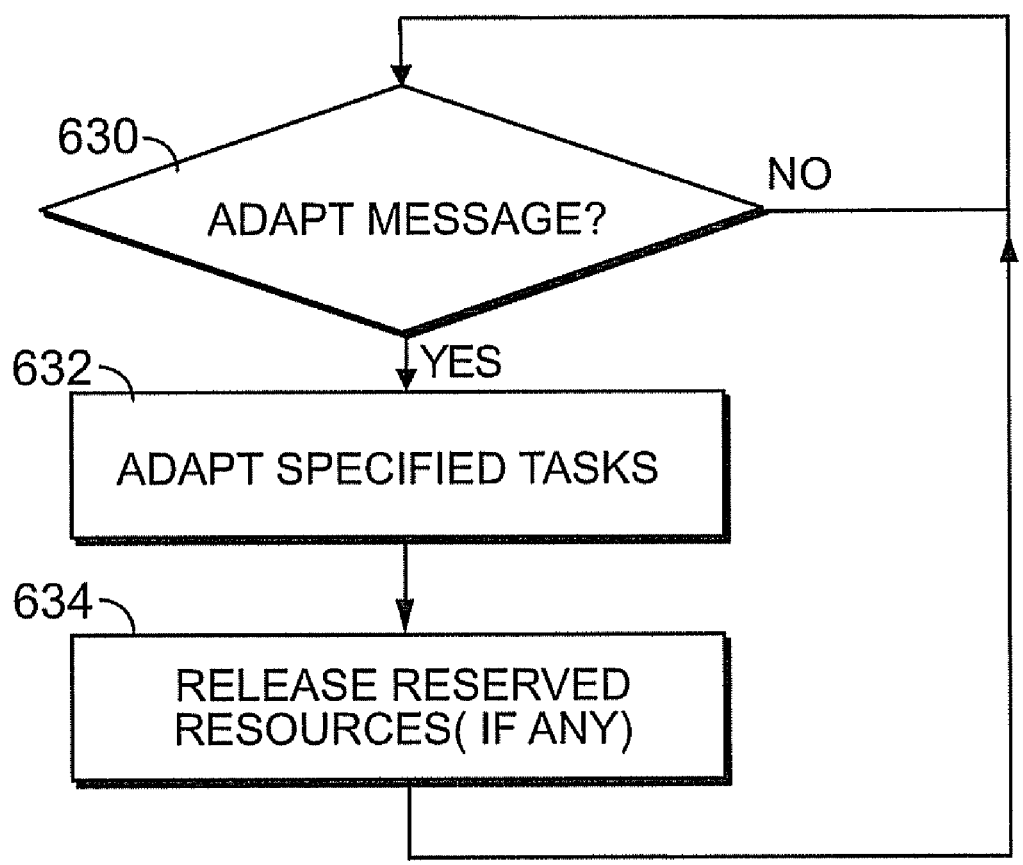

FIGS. 6A-6B are flow diagrams of a method 600 of processing admission requests received from the cluster head node. In the embodiment shown in FIGS. 6A-6B, method 600 is performed by each node 102 in the network 100 that receives an admission request from cluster head node and that is to supply its resource availability to the initiator ASM 302 in response to the admission request. In the following description of FIGS. 6A-6B, the node 102 that performs method 600 is referred to here as the "receiving node." In one implementation of such an embodiment, the functionality of method 600 is implemented as a part of the application service manager 302 executing on the receiving node 102, which interacts with the resource managers 304 on that node 102 as appropriate.

As shown in FIG. 6A, a receiving node 102 listens for an admission request originating from a cluster head node (block 602). When the receiving node 102 receives an admission request forwarded from an a cluster head node, the receiving node 102 receives the admission request (block 604) and, in response thereto, determines the availability on the receiving node 102 for each type of resource specified in the admission request (block 606). In one implementation, the application service manager 302 of the receiving node 102 contacts the resource manager 304 for each type of resource specified in the admission request. Each contacted resource manager 304 determines the resource availability for the one or more resources managed by that resource manager 304. The resources that a particular resource manager 304 manages are also referred to here as the "managed resources."

In the embodiment shown in FIG. 6A, the resource availability determination performed by each resource manager 304 includes two separate determinations. Each resource manager 304 determines, for each of its managed resources, the amount of that managed resource that is currently not being used (block 608). This amount is also referred to here as the "unused resources" or "unused resource availability." Also, each resource manager 304 determines, for each of its managed resources, any additional amount of that resource that could be freed up by having one or more tasks 106 adapt (that is, lower) their resource utilization of that resource (block 610). This amount is referred to here as the "adaptation resources" or "adaptation resource availability."

In one implementation, the adaptation resource availability determination is made based on the relative priority of the various tasks 106 that are using each managed resource. For example in one such implementation, each application 104 is assigned a priority level. If a first application 104 has a lower assigned priority level than the priority level assigned to a second application 104, the first application 104 and the tasks 106 that comprise the first application 104 have a lower priority than the second application 104 and the tasks that comprise the second application 104. In such an implementation, each resource manager 304 determines the adaptation resource availability, for each of its managed resources, by identifying those tasks 106 executing on the receiving node 102 that have a lower priority than the pending application 104 and that are utilizing that managed resource. For each such identified lower priority task 106, it is determined how much of that managed resource would be freed up if the lower priority task 106 reduced its resource utilization of that resource to the minimum level permitted under the lower priority task's QoS contract.

In another implementation, the adaptation resource availability determination is made based on, at least in part, a class assigned to the tasks 106 for a given managed resource. For example, in one such implementation each application 104 is assigned a QoS class (such as best efforts, essential, critical, etc.) for a given managed resource (such as a network resource). Each class defines a policy or other relationship between the tasks assigned to that class and the given managed resource. The policy determines under what circumstances and by how much the utilization of the given managed resource by such tasks can be adapted. In such an implementation, each resource manager 304 determines the adaptation resource availability, for each of its managed resources, by identifying those tasks 106 executing on the receiving node 102 that have an assigned class that permits adaptation under the circumstances existing at that moment. For each such identified task 106, it is determined how much of that managed resource would be freed up if that task 106 reduced its resource utilization of that resource to the minimum level permitted under that task's QoS contract and assigned class.

The total resource availability for the receiving node 102 is then sent to the initiator node 102 (block 612). In one embodiment, for example, the initiator node 102 is identified in the admission request received by the receiving node 102. For those pending tasks 106 for which the receiving node 102 has sufficient resources to satisfy the QoS requirements specified in the admission request, the node 102 reserves those resources for those pending tasks (block 614). In one implementation, the receiving node 102, for each such pending task 106, reserves the maximum amount of each such resource that is available, up to the maximum resource level specified in the admission request for the pending task 106. While a portion of a resource is in the reserved state, the receiving node 102 treats the reserved resources, for the purposes of determining resource availability for subsequent admission requests, as if the associated pending task 106 has actually been committed on the receiving node 102. In such an implementation, both unused resources and adaptation resources are reserved in this manner.

The reserved resources remain in the reserved state until the receiving node 102 receives a commit message from the initiator node 102 related to the previously received admission request (checked in block 616) or until a timeout period has elapsed since the reserved resources were reserved (checked in block 618). For example, in one implementation, a timeout period of 120 seconds is used. The commit message sent from the initiator node 102 will specify which of the resources reserved on the receiving node 102 should actually be used to execute the associated pending tasks 106 on the receiving node 102. Thus when the receiving node 102 receives such a commit message, the receiving node 102 commits each reserved resource specified in the commit message and starts execution of the associated pending task 106 (block 620). Also, the receiving node 102 releases all the other reserved resources, if any (block 622). If a commit message related to the previously received admission request is not received within the timeout period, the receiving node 102 releases all the reserved resources for that admission request (block 622). After the reserved resources have been released, those resources are again available for subsequent admission requests. The overhead associated with "rolling back" such resource reservations when the reserved resources are not ultimately going to be used for the pending admission request is reduced in such an embodiment (for example, as compared to sending additional messages indicating that the reserved resources should be released).

In addition to listening for and processing admission requests, each receiving node 102 also listens for and processes adapt messages that are sent out by an initiator node 102 as described above in connection with FIGS. 4A-4B. As noted above, an adapt message notifies the receiving node 102 that a distributed application 104 executing on the receiving node 102 has been adapted. An adapted application 104 is running on the receiving node 102 if one or more of the tasks 106 comprising the adapted application 104 are executing on the receiving node 102. When a receiving node 102 receives an adapt message (checked in block 630 of FIG. 6B), the receiving node 102 adapts the tasks 106 for the adapted application 104 that are executing on the receiving node 102 if appropriate (block 632).

As noted above, when a distributed application 104 has been adapted, at least one of the tasks 106 that comprise the adapted application 104 has had its resource utilization lowered on the node 102 on which that task 106 executes. The nodes 102 on which such tasks 106 execute are sent a commit message. As noted above, an adapt message is sent to the other nodes 102 on which the adapted application 104 executes, if any, that have not received a commit message. Those nodes 102 that do not receive a commit message and on which the adapted application 104 executes need to be informed that the application 104 has been adapted.

When such a node 102 receives an adapt message, the node 102 is able to adjust the resource utilization for the adapted application 104 to be compatible with the application's resource utilization on other nodes 102 (for example, as described below in connection with FIG. 6B). For example in one exemplary usage scenario, a distributed application 104 has a pipeline topology. At some point during execution of the distributed application 104, one late-stage task 106 in the application 104 is adapted so that the rate at which the task 106 processes input is reduced. The input that is processed by such an adapted task 106 is the output from other earlier-stage tasks 106 in the same distributed application 104. When the nodes 102 executing such earlier-stage tasks 106 receive an adapt message, the nodes 102 are able to reduce the output of such earlier-stage tasks 106 to match the rate at which the late-stage task 106 can process such output. In this way, resources can be more efficiently used.

Also, each node 102 that receives an adapt message releases any resources reserved for the pending application 104, if any (block 634). That is, if the node 102 that received the adapt message had previously reserved resources for the pending application, those reserved resources are released since that node 102 knows by virtue of receiving the adapt message that it will not receive a commit message. In other embodiments and implementation, however, this may not be the case.

Figure 7A:
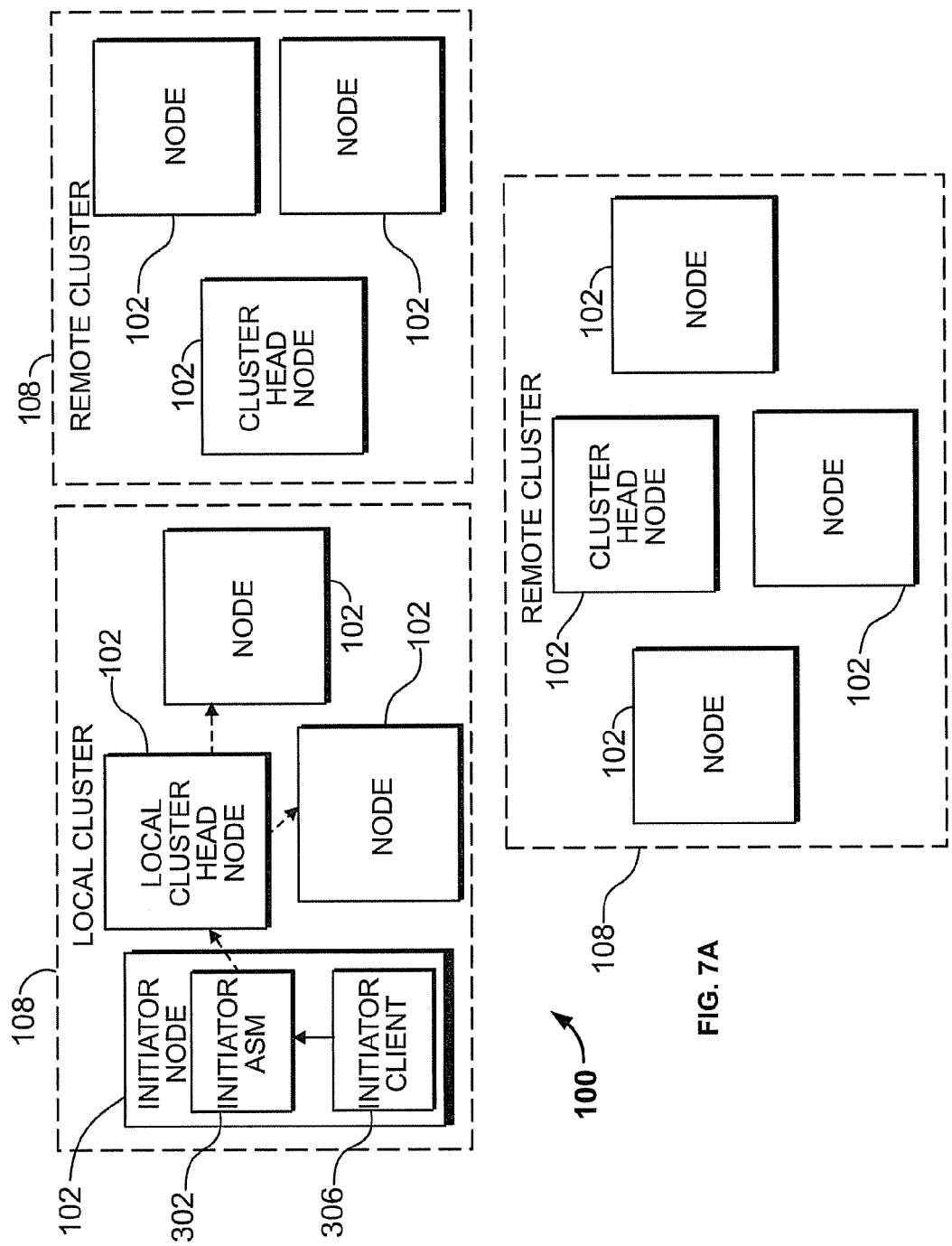
Figure 7B:
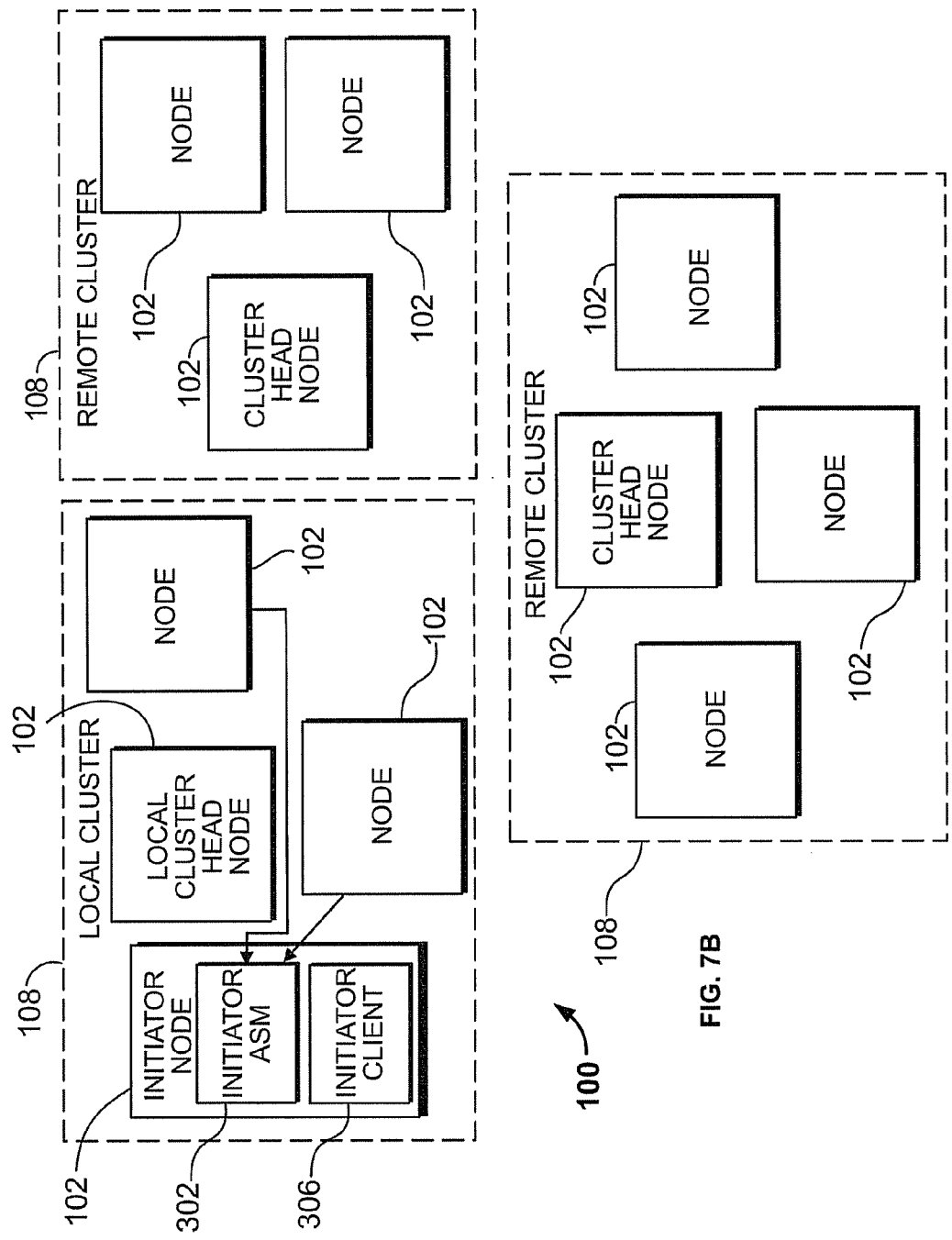

FIGS. 7A-7D are block diagrams illustrating the operation of the embodiment of the application admission protocol shown in FIGS. 4A-4B, 5A-5B, and 6A-6B. As shown in FIG. 7A when the initiator client 302 wishes to have a distributed application 104 admitted and executed on one or more nodes 102 in the network 100, the initiator client 306 sends an admission request to the initiator application service manager 302 that is executing on the initiator node 102 (shown using a solid line in FIG. 7A). In this example, the initiator client 306 and the initiator ASM 302 are executing on the same node, the initiator node 102. The initiator ASM 302 receives the admission request and forwards the admission request to the local cluster head node 102 (shown using a dashed line in FIG. 7A).

The cluster head node 102 (more specifically, the ASM 302 executing on the cluster head node 102) receives the admission request and forwards the admission request to all the nodes 102 in the local cluster 108 (shown using dotted lines in FIG. 7A). Each of the nodes 102 (more specifically, the ASM 302 executing on each node 102) in the local cluster 108 determines the resource availability for that node 102. In this embodiment, the resource availability includes both the unused resource availability and the adaptation resource availability. Each node 102 in the local cluster 108 sends or otherwise informs the initiator ASM 302 of that node's resource availability (shown using solid lines in FIG. 7B). Also, each such node 102 in the local cluster 108 reserves the resources (both unused resources and adapt resources) needed for the pending application 104.

After the initiator ASM 302 has received the resource availability from the nodes 102 in the local cluster 108 (or after a predetermined period has elapsed), the initiator ASM 302 attempts to map the pending tasks 106 that comprise the pending application 104 on to the nodes 102 that provided resource availability information to the initiator ASM 302. In this example, there are not enough available resources on the nodes 102 in the local cluster 108. Therefore, the initiator ASM 302 is not able to successfully map all pending tasks 106 to the nodes 102 in the local cluster 108. As a result, the initiator ASM 302 requests (shown using a solid line in FIG. 7C) that the local cluster head 102 forward the admission request on to another cluster 108 in the network to check for resource availability in that other cluster 108. The local cluster head 102 receives the request and selects a remote cluster 108 in the network 100 that has not previously been checked for resource availability for the current pending application 104.

Figure 7C:
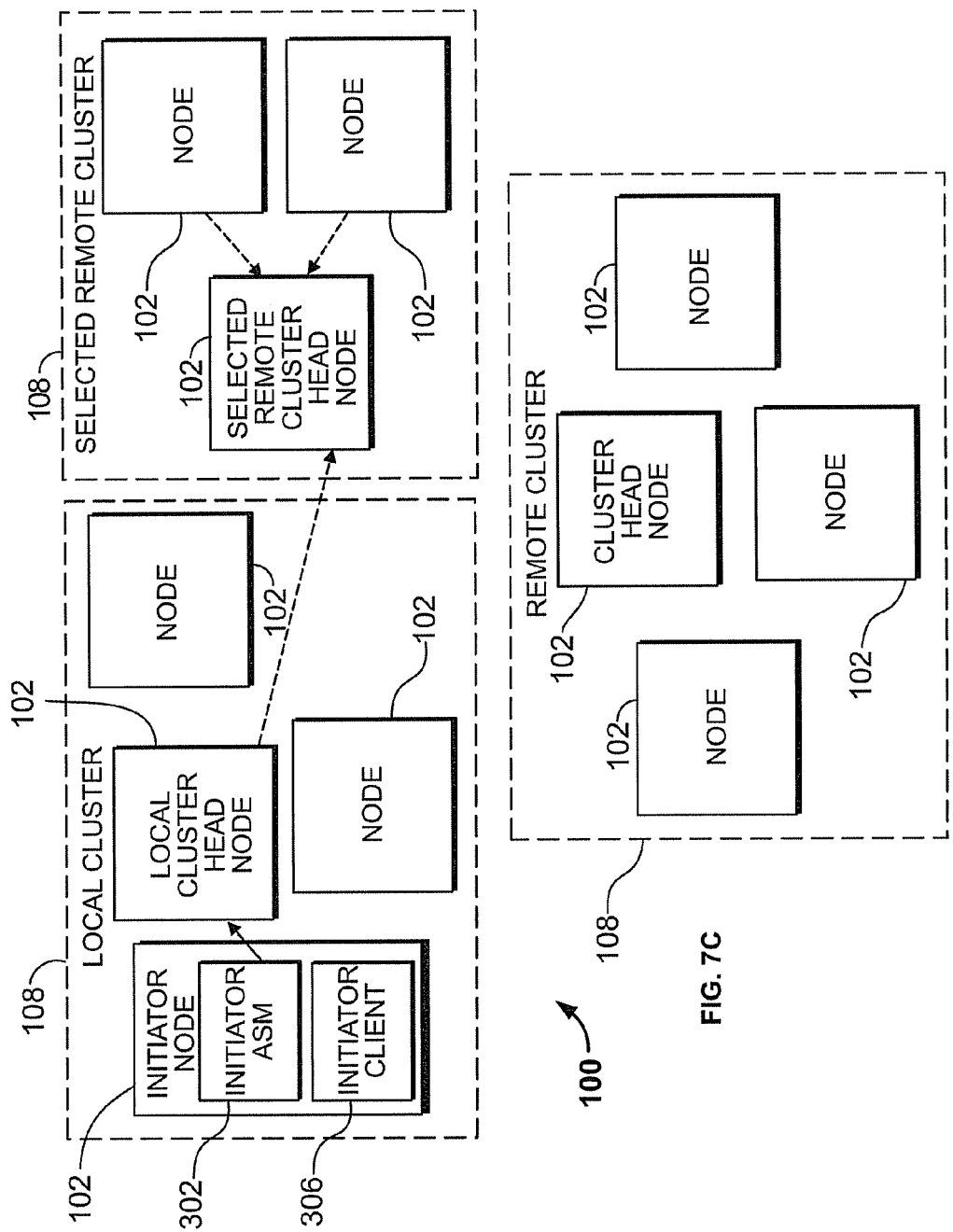
Figure 7D:
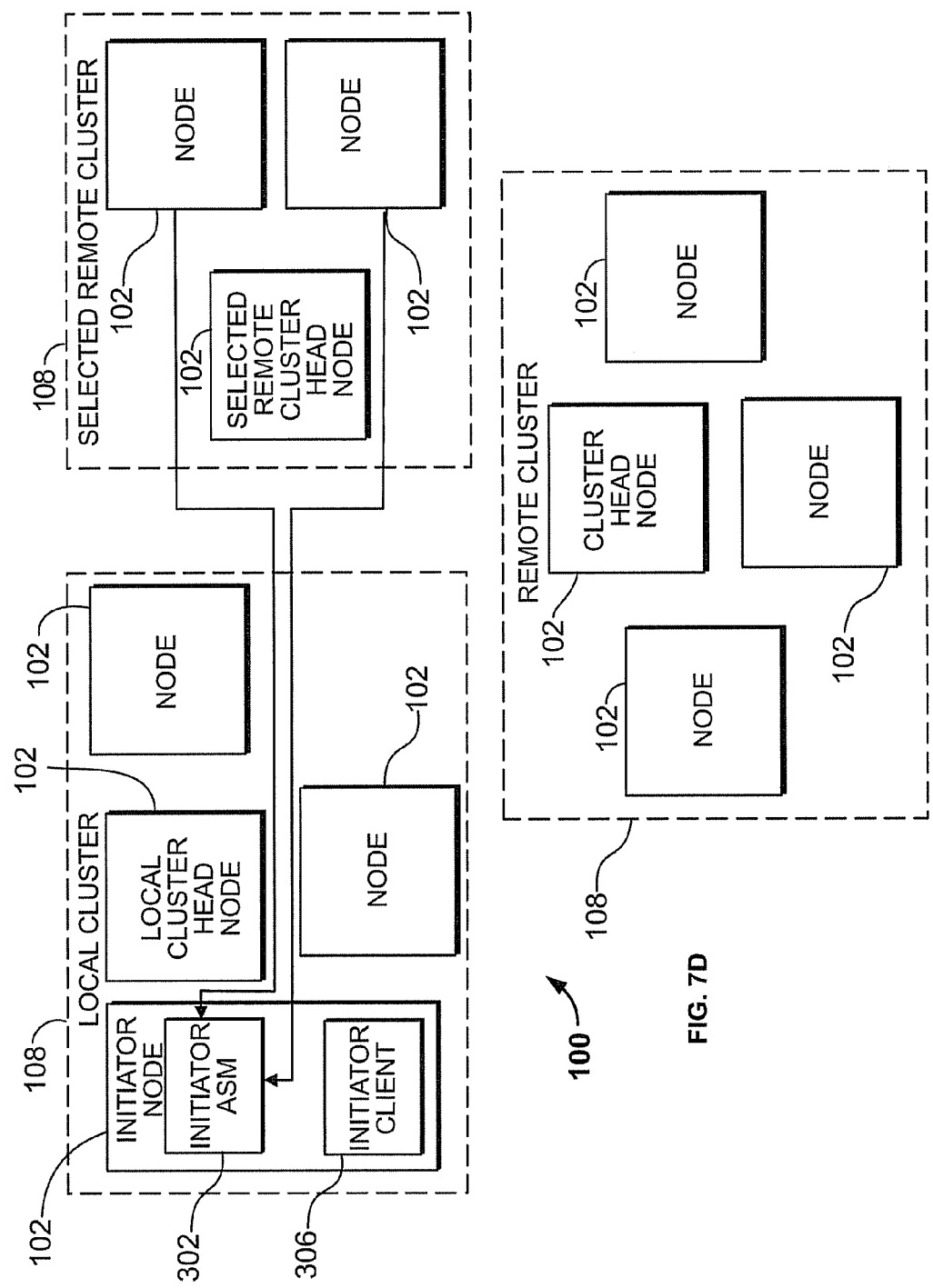
Figure 7E:
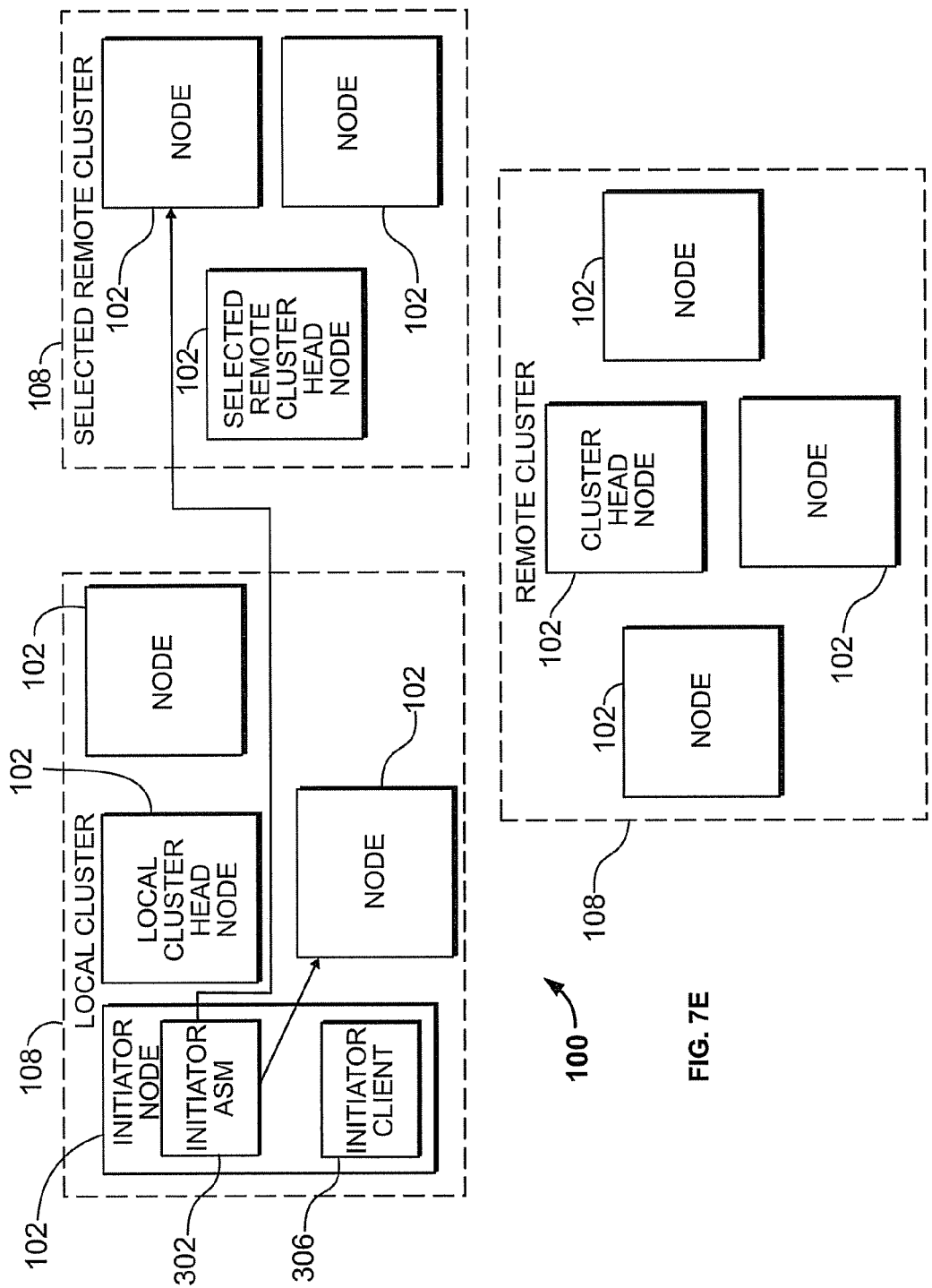
Figure 7F:
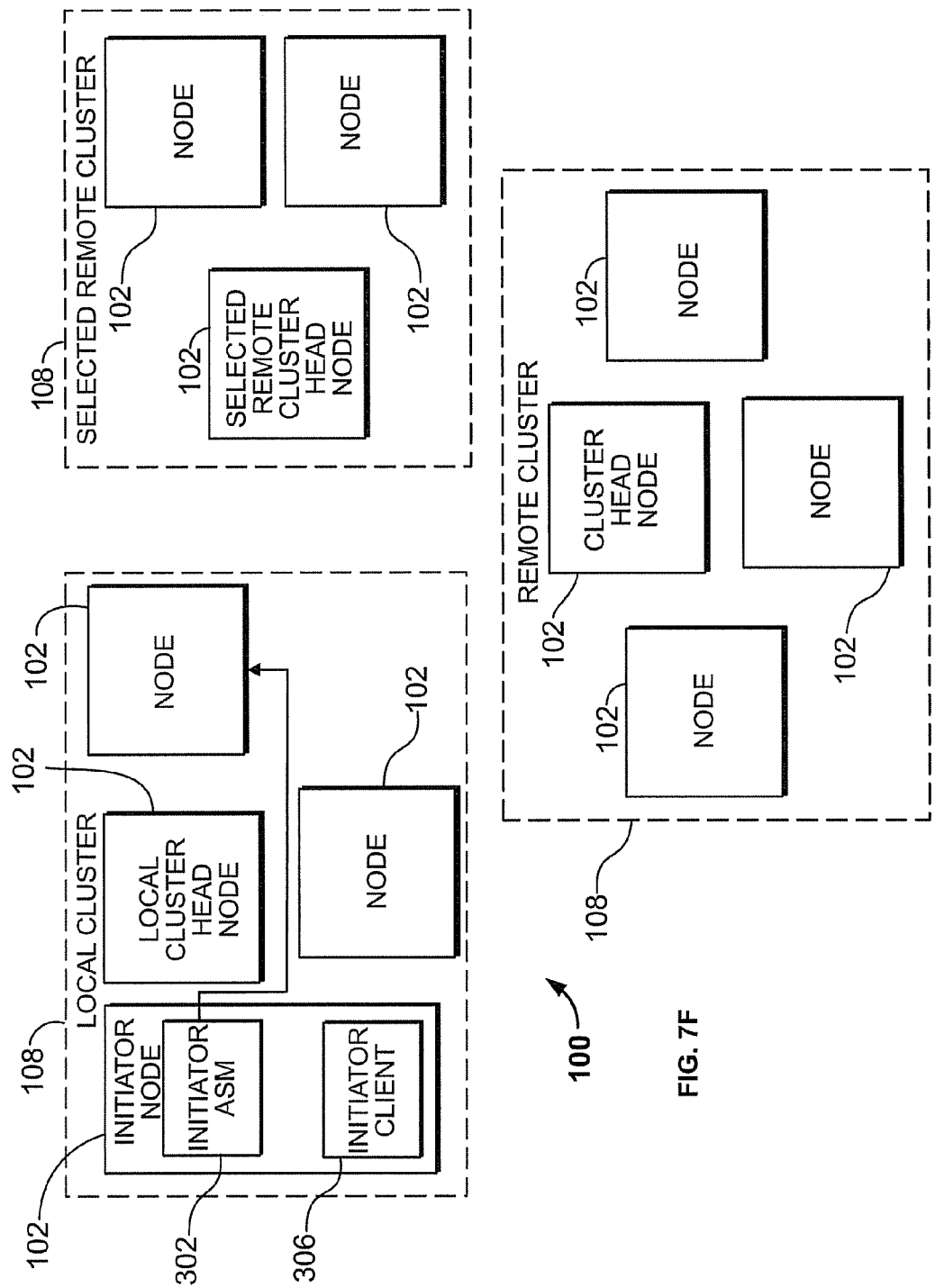

Then, the local cluster head 102 forwards the admission request to the cluster head node 102 for the selected remote cluster 108 (shown using a dashed line in FIG. 7C). The cluster head node 102 of the selected remote cluster 108 forwards the admission request on to all the nodes 102 in the selected remote cluster 108 (shown using a dotted lines in FIG. 7C). Each of the nodes 102 (more specifically, the ASM 302 on each of the nodes 102) in the selected remote cluster 108 determines the resource availability for that node 102. As noted above, this determination includes determining both the unused resource availability and the adaptation resource availability for each node 102. Each node 102 in the selected remote cluster 108 sends or otherwise informs the initiator ASM 302 of that node's resource availability (shown with solid lines in FIG. 7D). Also, each such node 102 in the selected remote cluster 108 reserves the resources (both unused resources and adaptation resources) needed for the pending application 104.

After the initiator ASM 302 has received the resource availability from the nodes 102 in the selected remote cluster 108 (or after a predetermined period has elapsed), the initiator ASM 302 attempts to map the pending tasks 106 that comprise the pending application 104 on to the nodes 102 that provided resource availability information to the initiator ASM 302 (that is, the nodes 102 in the local cluster 108 and the selected remote cluster 108). In this example, there are enough available resources in the local cluster 108 and the remote cluster 108 to admit the pending application. Therefore, the initiator ASM 302 on the initiator node 102 sends commit messages to those nodes 102 in the local cluster 108 and the selected remote cluster 108 on which a pending task has been mapped and will execute (shown using a solid line in FIG. 7E). Each node 102 that receives a commit message commits those resources and executes those pending tasks 106 identified in the commit message received by that node 102. Also if the commit message indicates that another task executing on receiving node should be adapted, the receiving node 102 adapts the indicated task as specified in the commit message. Each node 102 that receives a commit message also releases those resources not needed to execute any pending task 106.

In this example, one distributed application 104 needs to be adapted in order to admit the pending application 104. The initiator ASM 302 sends an adapt message to those nodes 102 in the network 100 that on which the adapted application 104 executes that have not received a commit message (shown using a solid line in FIG. 7F). Each node 102 that receives an adapt message adapts the tasks 106 identified in the adapt message received by that node 102 as appropriate. Also, each node 102 that receives an adapt message release any resources reserved for the pending application 104, if any.

In addition, for those nodes 102 that reserved resources for the pending application 104 during the admission process but did not receive a commit message or an adapt message, those nodes 102 release any resources reserved for the pending application 104 after the relevant timeout period elapses.

FIG. 8 is a simplified block diagram of one embodiment of a node 800. The node 800 is suitable for use in the ad hoc wireless network 100 shown in FIG. 1 and is suitable for implementing the methods and techniques described here. The node 800 includes a wireless transceiver subsystem 802. In one embodiment, the wireless transceiver subsystem 802 is a radio frequency (RF) transceiver subsystem. The wireless transceiver subsystem 802 includes appropriate components (for example, antenna, amplifiers, modulators, demodulators, analog-to-digital (A/D) converters, digital-to-analog (D/A) converters, etc.) to handle the transmission and reception of wireless data over a wireless network. The node 800 also includes a control subsystem 804. In the embodiment shown in FIG. 8, the control subsystem includes a programmable processor 806. Programmable processor 806 is coupled to the wireless transceiver subsystem 802 in order to monitor and control the transmission and reception of wireless data over a wireless network. The control subsystem 804 also includes a memory 808 in which program instructions and data used by the programmable processor 806 are stored and from which they are retrieved. One or more of the methods and techniques described here, in one embodiment, are implemented using software executed on the programmable processor 806. Such software comprises appropriate program instructions 810 that are stored in a tangible medium readable by the programmable processor 806 (for example, in memory 808). The instructions, when executed by the programmable processor 806, cause the node 800 to carry out at least a portion of the functionality of the methods and techniques described here as being performed by a node. The software creates and/or interacts with appropriate data structures 812 stored in memory 808.

The following describes an exemplary resource allocation model for a single distributed application 104. Such a single-application resource allocation model characterizes the mapping of the one or more tasks 106 of the single distributed application to one or more nodes 102 in the network 100. Such a resource allocation model also characterizes the allocation of resources among the one or more tasks 106 that comprise the distributed application 104. Examples of such resources are node resources and network resources.

The single-application resource model described here is based on the following assumptions that simplify the problem formulation. First, it is assumed that the quality-of-service (QoS) dimensions have a one-to-one correspondence to system resources types. A QoS request for an application specifies, for each resource that is needed by that application, a minimum resource vale ("min") and a maximum resource value ("max"). The definition of the min and max values defines a range of acceptable allocations for that resource.

Another assumption is that node resources are modeled as limited buckets of capacity $r^{max}$ with the admission condition $\Sigma r_i \leq r^{max}$, where $r_i$ is the resource amount allocated for task i. The total resource utilization in the network 100 cannot exceed the total amount of resources available in the network 100.

Another assumption is that a network resource is modeled as a limited bucket associated with a pair of nodes 102 that communicate over one or more wireless network links. The example of a network resource used in the exemplary single-application resource allocation model described here is communication bandwidth between two nodes 102 in the network 100.

Another assumption is that the wireless network links established between any two nodes 102 in the network 100 are bi-directional. Also, it is assumed that each of the bi-directional connections in each such network link share the same network resource. That is, in this exemplary resource allocation model, each of the bi-directional connections in each network link shares the same communication bandwidth.

Another assumption that is made in the exemplary single-application model described here is that resources are independent of each other. Also, it is assumed that resources are not probabilistic and the system guarantees the contracted QoS.

The single-application model defines node resources and network resources and formalizes allocation constraints. In such a model, the allocation problem is formulated as an optimization problem. There are n nodes 102 and m types of node resources and one type of network resource. A distributed application T comprises s communicating tasks, $T=(T_1, T_2, \ldots, T_s)$.

An admission request (also referred to here as a "QoS request") for distributed application T is described, in such a model, by a set of quality-of-service descriptors, one for each QoS dimension. The QoS request is described by matrices $Q^m$ and $Q^M$. Matrices $Q^m$ $(q_{ij}^m)_{i=1,\ldots,m, j=1,\ldots,s}$ and $Q^M=(q_{ij}^M)_{i=1,\ldots,m, j=1,\ldots,s}$ define the minimum and maximum QoS requirements, respectively, for application tasks $T_1, \ldots, T_s$, where m is the number of QoS dimensions (that is, number of node resource types) and $q_{ij}^m \leq q_{ij}^M$. In addition, $q_1$ is considered "a better QoS" than $q_2$ if $q_1 > q_2$.

Matrix $R^0$ describes the available resources before application admission. $R^0=(r_{ij}^0)_{i=1,\ldots,m, j=1,\ldots,n}$, where $r_{ij}^0$ is the available amount of resource of type i on node j and $R^0 \in [0, \infty)^{m \times n}$.

The admission control admits the s tasks in the system. The mapping of the s tasks on the n nodes is given by matrix:

$$X=(x_{ij})_{i=1,\ldots,s, j=1,\ldots,n},$$

with $$x_{ij} = \begin{cases} 1, & \text{if task } Ti \text{ was mapped (that is, allocated) on node } j, \\ 0, & \text{otherwise;} \end{cases}$$

where $X \in \{0, 1\}^{s \times n}$.

The vector Map is defined as $Map_i=j$ if task $T_i$ was mapped on node j. The resource management system (for example, an initiator application service manager) allocates resources $R = (r_{ij}^a)_{i=1,\ldots,m, j=1,\ldots,s}$ to the s tasks, where the amount $r_{ij}^a > 0$ of resource i has been assigned to task j.

The single-application resource allocation described here assumes that network resources are allocated independently for each communication link between any two nodes. The network resource is modeled by a limited bucket for each bi-directional link established between a pair of nodes (i, j). Matrix $NR^0$ defines the available network resource at admission time, where $NR^0 \in [0, \infty)^{n \times n}$ and $NR_{ij}^0$ defines the network resource available to the (i, j) communication link.

Matrices $NQ^m$ and $NQ^M$ define the minimum and maximum network resource requirement, respectively, for each communication link (i, j), for which tasks $T_i$ and $T_j$ communicate, where $NQ^m$ and $NQ^M \in [0, \infty)^{s \times s}$.

The set TC contains all required connections between tasks. Thus, $TC=\{(i,j) | T_i \text{ communicates with } T_j, i<j\}$.

Matrix $NQ^a$ defines the allocated network resource. Thus, $NQ_{ij}^a$=network resource allocated for communication link $(T_i, T_j)$, where $NQ^a \in [0, \infty)^{s \times s}$.

This resource model assumes there is a (possible multi-hop) path in the network between any two nodes and that all resource allocations for connections are independent. The resource management system maps the tasks to nodes and allocates resources for each connection between two tasks. A connection between tasks $T_i$ and $T_j$ is mapped to a connection between nodes $Map_i$ and $Map_j$. The system allocates $NQ_{ij}{}^a$ resource to the (i, j) connection by subtracting the same resource amount $NQ_{ij}{}^a$ from the available network resource for connection ($Map_i$, $Map_j$), where after allocation:

$$NR^0[Map_i, Map_j]' = NR^0[Map_i, Map_j] - NQ_{ij}{}^a.$$

Matrix $NR^a$ defines the allocated network resources for an application $(T_1, \ldots, T_s, TC)$:

$$NR^a = (nr_{xy}{}^a)_{x,y=1,\ldots,n},$$

where $nr_{xy}{}^a = nq_{ij}{}^a$ and $(x, y) = (Map_i, Map_j)$ and $NR^a \in [0, \infty)^{n \times n}$.

In other embodiments, this resource model can accommodate alternate allocation strategies by adjusting the equations for resource constraints and resource availability update. For example, in another embodiment, network resources are modeled based on node communication capacity and explicit end-to-end path information that would be available from the routing protocol.

The single-application resource allocation model described here also specifies various conditions that any resource allocation must meet in such an embodiment. These conditions are also referred to here as "constraints." One type of constraint relates to node resources and such constraints are referred to here as "node resource constraints." In the exemplary single-application resource allocation model described here, one node resource constraint relates to task mapping and specifies that each task is admitted on exactly one node as specified by:

$$\sum_{j=1,\ldots,n} x_{ij} = 1, \text{ for all task } i = 1, \ldots, s.$$

Another node constraint relates to application quality-of-service and specifies that allocated resources satisfy QoS requirements:

$$Q^m \leq R^a \leq Q^M$$

Another node constraint relates to resource availability and specifies that a particular resources allocation is limited by availability:

$$R^a X \leq R^0 \text{ or}$$

$$x_{1j} r_{i1}{}^a + x_{2j} r_{i2}{}^a + \ldots + x_{sj} r_{is}{}^a \leq r_{ij}{}^0,$$

for all resources $i=1, \ldots, m$ and all nodes $j=1, \ldots, n$.

Another type of constraint relates to network resources and such constraints are referred to here as "network resource constraints." In the exemplary single-application resource allocation model described here, one network resource constraint relates to application QoS and specifies that all connections between tasks must be allocated network resources between minimum required and maximum needed. Note that, in such an exemplary model, Map maps from $NR^a$ to $NQ^a$, where $NQ^m \leq NQ^a \leq NQ^M$. Another network constraint relates to resource availability and specifies that the allocated network resource for all connections cannot exceed the available limit. That is, $NR^a \leq NR^0$.

The optimal resource allocation is designed to maximize the application QoS utility defined as a function of the combined QoS satisfaction ratio for all tasks. The application's overall utility is a linear combination of the node task utility and the network utility.

The node utility of task $T_i$ for resource j is normalized to:

$$u_{ij} = \begin{cases} \dfrac{r_{ij}^a - q_{ij}^M}{q_{ij}^M - q_{ij}^m}, & \text{if } r_{ij}^M > r_{ij}^m \\ 1, & \text{otherwise} \end{cases}$$

Matrix $U = (u_{ij})_{i=1,\ldots,s, j=1,\ldots,m}$. The node utility of task $T_i$ is a weighted sum of resource utilities:

$$u_i = w_1 u_{i1} + \ldots + w_m u_{im}, \text{ with } i = 1, \ldots, s.$$

Weights $w_j \geq 0$, $j=1, \ldots, m$, and $\Sigma w_j = 1$. The application node utility vector is $V = (u_1, \ldots, u_s)^T = UW$, where $V \in R_+^{*s \times 1}$, $W = (w_1\ w_2 \ldots w_m)^T \in R_+^{*m \times 1}$, $w_j \geq 0$, and $\Sigma w_j = 1$.

In the exemplary single-application module described here, a network utility is defined. The network utility nu for application (T, TC), is defined as:

if $nq_{ij}^M = nq_{ij}^m$ or i=j then nu=1, awarding maximum utility for full allocation or for tasks mapped on the same node;

if $nq_{ij}^M > nq_{ij}^m$, then:

$$nu = \sum_{i=1,\ldots,s} \sum_{j=1,\ldots,s, i \neq j} \frac{nq_{ij}^a - nq_{ij}^m}{nq_{ij}^M - nq_{ij}^m}.$$

In the exemplary single-application module described here, an application utility is defined. The application utility for a multi-staged admitted application is defined as the weighted sum of node task utilities and the network utility:

$$v = \alpha_1 u_1 + \alpha_2 u_2 + \ldots + \alpha_s u_s + \alpha_{s+1} nu.$$

In matrix notation, $v = A(V\ nu)^T$, with $A = (\alpha_1 \ldots \alpha_s, \alpha_{s+1})$, $\alpha_i \geq 0$, and $$\sum_{i=1,\ldots,s+1} \alpha_i = 1.$$

In the exemplary single-application model described here, the optimal allocation problem is to determine the task mapping X, a node resource allocation $NR^a$ and a network resource allocation $NQ^a$, so that the node resource constraints and network resource constraints described above are obeyed and the application utility v described above is maximized. This is a mixed integer programming optimization problem with a fairly complex structure. The resource allocation problem is NP-hard by reduction to the integer bin-packing problem. The technique for admitting a distributed application described above in connection with FIGS. 1-8 attempts to overcome the complexity of the optimization problem.

Formulating the admission utility function using weighted sums allows us to inject user-defined policies and application semantics into the allocation process. For the node task utility function, the relation between the resource type weights $w_j$, may impact the contribution of the task to the overall application utility, thus being a factor to the final mapping of tasks to nodes. In essence, the weight $w_j$ can be directly correlated to the relative importance the user assigns to a resource type j. The admission process will map tasks to nodes where allocation of specific resources contributes maximum utility. For instance, if the fraction $W_{CPU}/W_{Memory} = 1/3$, then the admission algorithm, in the process of optimizing the total application utility value, will be more likely to map tasks to nodes where the memory allocation is closer to the maximum required. Similarly, the weights $\alpha_i$ from the application utility formula can be adjusted by users to express preference towards maximizing utility of specific tasks or of the network bandwidth allocation ($\alpha_{s+1}$).

The following describes another exemplary resource allocation model for multiple distributed applications 104. Such a multiple-application resource allocation model characterizes the mapping of the one or more tasks 106 of multiple distributed applications to one or more nodes 102 in the network 100. Such resource allocation model also characterizes the allocation of resources among the one or more tasks 106 that comprise each of the multiple distributed applications. Examples of such resources are node resources and network resources.

In this exemplary multi-application module, each of the multiple distributed applications is characterized by a priority, common for all the application's stages (that is, tasks). It is also assumed that each of the distributed applications is admitted if all of its stages are admitted to the system. A constraint that applies to this model is that higher priority applications are never preempted by lower priority applications. The objective of this exemplary multi-application model is to maximize the QoS satisfaction level for higher-priority applications. In other embodiments, the optimization goal is to maximize the overall number of admitted applications.

In this exemplary multi-application resource allocation module, the system admits and allocates resources for the set $A=(A_1, \ldots, A_t)$ of t applications, ordered increasingly on priority. The system comprises n nodes with resource availability $R^0 = (r_{ij}^0)_{i=1,\ldots,m, j=1,\ldots,n}$, for m resources distributed on the n nodes, and $NR^0$ for network resources. Each application $A_i$ is characterized by a priority $p_i > 0$. In this exemplary multi-application module, it is assumed that $p_i \leq p_{i+1}$. Also, for each application $A_i$, a minimum requested QoS $Q_i^m$ and a maximum requested QoS $Q_i^M$ for node resources are defined. Note that, in this embodiment, QoS dimensions map one-to-one to resources. Further, for each application $A_i$, a minimum requested QoS $NQ_i^m$ and a maximum requested QoS $NQ_i^M$ for network resources are defined.

The resource management system (for example, an initiator application service manager) maps application tasks and allocate resources. The vector $Y=(y_1, \ldots, y_t)$ indicates the application admission:

$$y_i = \begin{cases} 1, & \text{if } A_i \text{ is admitted} \\ 0, & \text{otherwise} \end{cases}$$

And matrices $X_i$ define individual task mapping for application i.

The global objective function for this exemplary multi-application model is normalized for individual application utility values. In this model, it is desired that the utility contributed by each application to the overall objective be proportional to the QoS (that is, amount of resources) received from the system and not to the number of stages.

The application node utility for application i is therefore normalized on the number of stages $s_i$ and the network utility is also normalized on the number of connections $|TC_i|$:

$$v_i = \frac{\alpha_1 u_1 + \alpha_2 u_2 + \ldots + \alpha_{s_i} u_{s_i}}{s_i} + \frac{\alpha_{s_i+1} n u_i}{|TC_i|},$$

$$v_i = A\left(\frac{V}{s_i}; \frac{nu}{|TC_i|}\right)^T,$$

with weight factors $A=(\alpha_1 \ldots \alpha_{s_i}, \alpha_{s_i+1})$, $\alpha_j \geq 0$, and $\Sigma_{j=1,\ldots,s_i+1} \alpha_j = 1$.

The global objective function assigns more weight to utility contributed by higher priority applications. The goal, in this exemplary model, is to maximize v*:

$$v^* = y_1 p_1 v_1 + y_2 p_2 v_2 + \ldots + y_t p_t v_t = \sum_{i=1,\ldots,t} y_i p_i v_i,$$

where $y_i \in \{0, 1\}$, and $$y_i = \begin{cases} 1, & \text{if application } i \text{ is admitted} \\ 0, & \text{otherwise} \end{cases}$$

The set of constraints for the optimization problems relates to resource allocation and priority-based preemption. The resource constraints are an extension of those listed above in connection with the single-application resource application model. The constraints specify that the resources allocated to all applications should not exceed initial availability:

$$\sum_{i=1,\ldots,t} y_i R_i^a X_i \leq R^0, \text{ for node resources, and}$$

$$\sum_{i=1,\ldots,t} y_i NR_i^a \leq NR^0, \text{ for network resources.}$$

The constraints specify that the allocated resources should satisfy QoS demands for admitted applications. For all i=1, ..., t:

$y_i Q_i^m \leq y_i R_i^a \leq y_i Q_i^M$, for node resources, and
$y_i NQ_i^m \leq y_i NQ_i^a \leq y_i NQ_i^M$, for network resources.

The constraint stating that higher priority applications cannot be preempted by lower priority applications is formulated as $y_i \leq y_{i+1}$, for all i=1, ..., t−1, where it is assumed that $p_i \leq p_{i+1}$.

In the multi-application resource allocation model described here, the allocation optimization problem is specified by maximizing the global objective function:

$$v^* = y_1 p_1 v_1 + y_2 p_2 v_2 + \ldots + y_t p_t v_t = \sum_{i=1,\ldots,t} y_i p_i v_i,$$

where:

$$v_i = \frac{\alpha_1 u_1 + \alpha_2 u_2 + \ldots + \alpha_{s_i} u_{s_i}}{s_i} + \frac{\alpha_{s_i+1} n u_i}{|TC_i|},$$

and i=1, . . . , t, and for each application i:
  $u_i = w_1 u_{i1} + \ldots + w_m u_{im}$, with i=1, . . . , s, $w_j \geq 0$, j=1, . . . , m, and $\Sigma w_j = 1$, and $$u_{ij} = \begin{cases} \dfrac{r_{ij}^a - q_{ij}^M}{q_{ij}^M - q_{ij}^m}, & \text{if } r_{ij}^M > r_{ij}^m \\ 1, & \text{otherwise.} \end{cases}$$

Also, for each application i, if $nq_{ij}^M = nq_{ij}^m$ or i=j (that is, tasks on same node) then, nu=1. Otherwise, if $nq_1^M > nq_{ij}^m$, then:

$$nu = \sum_{i=1,\ldots,s} \sum_{j=1,\ldots,s, i \neq j} \frac{nq_{ij}^a - nq_{ij}^m}{nq_{ij}^M - nq_{ij}^m},$$

with the following constraints (t is the number of applications):

$$\sum_{i=1,\ldots,t} y_i R_i^a X_i \leq R^0, \text{ for node resources, and}$$

$$\sum_{i=1,\ldots,t} y_i NR_i^a \leq NR^0, \text{ for network resources.}$$

Also, for all i=1, . . . , t:
  $y_i Q_i^m \leq y_i R_i^a \leq y_i Q_i^M$, for node resources;
  $y_i NQ_i^m \leq y_i NQ_i^a \leq y_i NQ_i^M$, for network resources, where Map maps from $NR_i^a$ to $NQ_i^a$;
  $y_i \leq y_{i+1}$, for all i=1, . . . , t−1, where it is assumed that $p_i \leq p_{i+1}$; and
  $y_1 \in \{0, 1\}$.

The resource allocation problem asks for computing the following matrices: Y for admitted applications and $X_i$ for task mappings for application i, $R_i^a$ for allocated node resources, and $NR_i^a$ for the network resource, for application i=1, . . . , t.

In one usage scenario, application admissions come at different times. The technique for admitting a distributed application described above in connection with FIGS. 1-8 considers QoS adaptation for existing applications, adding the extra resources to the available resources pool. This can be modeled by the above multi-application admission method by forcing selected critical applications (assumed in execution before this admission) to be admitted, that is, $y_i=1$.

The large number of variables (t+tsn+tsm+tnn) for this mixed integer program, makes a real-time approximation with branch-and-bound or even with a linear program unfeasible. The technique for admitting a distributed application described above in connection with FIGS. 1-8 attempts to overcome the complexity of the optimization problem.

In another embodiment making use of such a multi-application model, an alternative goal for the admission procedure is to maximize the overall number of accepted applications, where higher priority application have precedence. Later after admission, a QoS expansion phase would increase the QoS for admitted applications from remaining resources. The large optimization problem that results from such an embodiment can be broken in two smaller pieces with fewer unknowns. In other words, in such an embodiment, the admission process includes two phases.

The first phase is admission with minimal QoS, so that the overall number of admitted applications is maximized. The optimization problem can be formalized as maximizing the objective function:

$$v^* = \sum_{i=1,\ldots,t} y_i,$$

with the following constraints:

$$\sum_{i=1,\ldots,t} y_i Q_i^m X_i \leq R^0,$$

for node resources, and $$\sum_{i=1,\ldots,t} y_i NR_i^m \leq NR^0,$$

for network resources.
  for all i=1, . . . , t:
    $y_i Q_i^m = y_i R_i^u$, for node resources, and
    $y_i NQ_j^m = y_i NQ_i^a$, for network resources;
  for all i=1, . . . , t−1:
    $y_i \leq y_{i+1}$ and
    $y_i \in \{0, 1\}$, $y_i=1$ if application i is admitted.

By admitting applications at their minimum requested QoS, the solution space can be significantly decreased. Only the unknown matrices $X_i$ and $Y=(y_1, \ldots, y_t)$, with elements in $\{0, 1\}$ have to be determined for this integer program.

After the first phase of the two-phase admission process, indicators $y_i$ and $X_i$ have been determined. The second phase of the two-phase admission process involves QoS expansion. The system allocates remaining resources to admitted applications, with preference to higher priority applications. The QoS expansion can be formulated as a linear program as maximizing the objective function (the QoS satisfaction ratio):

$$v^* = y_1 p_1 v_1 + y_2 p_2 v_2 + \ldots + y_t p_t v_t = \sum_{i=1,\ldots,t} y_i p_i v_i,$$

where:

$$v_i = \frac{\alpha_1 u_1 + \alpha_2 u_2 + \ldots + \alpha_{s_i} u_{s_i}}{s_i} + \frac{\alpha_{s_i+1} nu_i}{|TC_i|},$$

and i . . . , t, and for each application i:
  $u_i = w_1 u_{i1} + \ldots + w_m u_{im}$, with i=1, . . . , s, $w_j \geq 0$, j=1, . . . , m, and $\Sigma w_j = 1$, and $$u_{ij} = \begin{cases} \dfrac{r_{ij}^a - q_{ij}^M}{q_{ij}^M - q_{ij}^m}, & \text{if } r_{ij}^M > r_{ij}^m \\ 1, & \text{otherwise.} \end{cases}$$

if $nq_{ij}{}^M = nq_{ij}{}^m$ or $i=j$ (that is, tasks on same node) then, nu=1.

Otherwise, if $nq_{ij}{}^M > nq_{ij}{}^m$, then:

$$nu = \sum_{i=1,\ldots,s} \sum_{j=1,\ldots,s, i \neq j} \frac{nq_{ij}^a - nq_{ij}^m}{nq_{ij}^M - nq_{ij}^m}$$

with the following constraints (t is the number of applications):

$$\sum_{i=k,\ldots,t} y_i R_i^a X_i \leq R^0,$$

for node resources, and $$\sum_{i=k,\ldots,t} y_i NR_i^a \leq R^0,$$

for network resources.

Also, for all i=k, . . . , t:

$Q_i{}^m \leq R_i{}^a \leq Q_i{}^M$, for node resources; and $NQ_i{}^m \leq NQ_i{}^a \leq NQ_i{}^M$, for network resources.

The ts(m+n) remaining unknowns for this linear program are matrices $R_i{}^a$ and $NQ_i{}^a$, for i=1, . . . , t.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system comprising:
   a wireless network comprising a plurality of clusters;
   wherein each cluster comprises a set of nodes including a cluster head node;
   wherein each node includes at least one resource;
   wherein when an initiator node in a local cluster included in the wireless network receives an admission request to execute an application comprising a set of tasks, the initiator node forwards the admission request to a local cluster head node for the local cluster;
   wherein when the admission request is forwarded to the local cluster head node, the local cluster head node requests that at least one of the set of nodes included in the local cluster provide resource availability information to the initiator node;
   wherein the initiator node attempts to map the set of tasks to a subset of the nodes included in the local cluster using the resource availability information received from nodes in the local cluster; and
   wherein, if the initiator node is unable to map the set of tasks to the subset of nodes included in the local cluster:
      the local cluster head node forwards the admission request to the cluster head node of successive clusters in the wireless network in order to have at least one node in each of the successive clusters send resource availability information to the initiator node until the initiator node is able to map the set of tasks to a subset of the nodes in the wireless network or until there are no additional clusters to forward the admission request to; and
      the initiator node attempts to map the set of tasks to a subset of the nodes from which resource availability information has been received based on the received resource availability information.

2. The system of claim 1, wherein each cluster head node that receives the admission request requests that the nodes within the same cluster as that cluster head node send resource availability information to the initiator node.

3. The system of claim 2, wherein each node that receives a request to send resource availability information to the initiator node:
   determines resource availability information for that node;
   sends the resource availability information to the initiator node; and
   reserves resources for the admission request from available resources;
   when the node receives a commit message sent from the initiator node to that node when the initiator node maps at least one of the tasks to that node, commits the reserved resources for the at least one of tasks mapped to that node and execute the at least one of the tasks mapped to that node; and
   when a predetermined amount of time elapses after reserving the reserved resources without receiving the commit message; release the reserved resources.

4. The system of claim 3, the predetermined amount of time is determined using a timer.

5. A method comprising:
   in a wireless ad hoc network having a plurality of clusters, each cluster comprising at least one of a plurality of nodes:
      attempting to map a set of tasks to at least one node within a first cluster of the wireless network based on adaptability resource availability of the nodes within the first cluster, wherein the adaptability resource availability of a node comprises an amount of a resource available for use based on a reduced utilization of the resource by the task; and if unable to map the set of tasks to said at least one node in the first cluster, attempting to map the set of tasks to at least one node in at least one of the first cluster and at least one of the other clusters in the wireless network based on resource availability of the nodes within the first cluster and the at least one of the other clusters in the wireless network.

6. The method of claim 5, further comprising receiving a request to admit an application for execution on at least one node in the network, the application comprising the set of tasks.

7. The method of claim 6, wherein the admission request is received at a first node.

8. The method of claim 7, wherein the request is received from a client executing on the first node.

9. The method of claim 7, further comprising forwarding the request to a head node of the first cluster and receiving, at the first node in the first cluster, first resource availability information from at least one node in the first cluster.

10. The method of claim 9, wherein the request is forwarded to the first head node based on a routing protocol.

11. The method of claim 9, further comprising, if unable to map the set of tasks to said at least one node in the first cluster, requesting that the head node of the first cluster communicate the request to a head node of the at least one of the other clusters in the wireless network and receiving, at the first node in the first cluster, resource availability information from at least one node in the at least one of the other clusters in the wireless network.

12. A system comprising:
a wireless network comprising a plurality of clusters;
wherein each cluster comprises a set of nodes including a cluster head node;
wherein each node includes at least one resource;
wherein when an initiator node in a local cluster included in the wireless network receives an admission request to execute an application comprising a set of tasks, the initiator node forwards the admission request to a local cluster head node for the local cluster;
wherein when the admission request is forwarded to the local cluster head node, the local cluster head node requests that at least one of the set of nodes included in the local cluster provide resource availability information to the initiator node;
wherein the initiator node attempts to map the set of tasks to a subset of the nodes included in the local cluster using the resource availability received from nodes in the local cluster; and
wherein, if the initiator node is unable to map the set of tasks to the subset of nodes included in the local cluster:
the initiator node requests that the local cluster head node forward the admission request to at least one remote cluster head node of at least one remote cluster included in the wireless network;
when the admission request is forwarded to the at least one remote cluster head node, the at least one remote cluster head node requests that at least one of the set of nodes included in the at least one remote cluster provide resource availability information to the initiator node; and
the initiator node attempts to map the set of tasks to a subset of the nodes included in at least one of the local cluster and the at least one remote cluster using the resource availability received from nodes in the local cluster and the at least one remote cluster.

13. The system of claim 12, wherein at least one node that provides resource availability information to the initiator node reserves at least a portion of the resources available on that node for at least one of the set of tasks.

14. The system of claim 13, wherein when the initiator node maps at least one of the set of tasks to at least one node that provides resource availability information to the initiator node, the initiator node sends a commit message to that node.

15. The system of claim 12, wherein an adapted application comprises a set of executing tasks and wherein at least one node in the network to which a task is mapped reduces an amount of at least one resource that is utilized by at least one of the set of executing tasks of the adapted application in order to execute the task mapped to that node.

16. The system of claim 15, wherein the initiator node sends an adapt message to at least one node in the wireless network on which at least one of the set of executing tasks of the adapted application executes.

17. A first node comprising:
a wireless transceiver to send and receive data over a wireless network;
a processor in communication with the wireless transceiver; and
a tangible medium, in communication with the processor, in which program instructions are embodied, wherein the program instructions, when executed by the processor, cause the first node to:
receive an admission request from a client, the admission request requesting that a set of tasks be executed;
forward the admission request to a local cluster head node for a local cluster in order to have at least one node in the local cluster send resource availability information to the first node, wherein the first node is a member of the local cluster;
receive resource availability information from the at least one node in the local cluster;
attempt to map the set of tasks to at least a subset of the nodes included in the local cluster using the resource availability information received from the at least one node in the local cluster; and
if unable to map the set of tasks to the subset of nodes included in the local cluster:
request that the local cluster head node of the local cluster forward the admission request to at least one remote cluster head node of at least one remote cluster included in the wireless network in order to have at least one node in the at least one remote cluster send resource availability information to the first node; and
attempt to map the set of tasks to at least a subset of the nodes included in at least one of the local cluster and the at least one remote cluster using the resource availability received from the at least one node in at least one of the local cluster and the at least one remote cluster.

18. The first node of claim 17, wherein the program instructions, when executed by the processor, cause the first node to attempt to map the set of tasks to the subset of the nodes included in the local cluster using the resource availability information received from the at least one node in the local cluster by attempting to map all of the tasks in the set of tasks to a single node in the local cluster.

19. The first node of claim 17, wherein the program instructions, when executed by the processor, cause the first node to attempt to map the set of tasks to the subset of the nodes included in at least one of the local cluster and the at least one remote cluster using the resource availability received from the at least one node in at least one of the local cluster and the at least one remote cluster by attempting to map all of the tasks in the set of tasks to a single node in at least one of the local cluster and the at least one remote cluster.

20. The first node of claim 17, wherein the resource availability information from the at least one node in the local cluster includes information about the availability of at least one of unused resources available on the at least node within the local cluster and resources that would be available if resources utilized by tasks executing on the at least one node within the local cluster were reduced.

21. The first node of claim 17, wherein the resource availability information from the at least one node in the at least one remote cluster includes information about the availability of at least one of unused resources available on the at least node within the at least one remote cluster and resources that would be available if resources utilized by tasks executing on the at least one node within the at least one remote cluster were reduced.

22. The first node of claim 17, wherein the wireless transceiver comprises a radio frequency transceiver.

23. Software embodied on a tangible medium readable by a programmable processor included in a first node of a wireless network comprising a plurality of clusters, the software comprising program instructions executable on at least one programmable processor included in the first node, the program instructions operable to cause the first node to:

receive an admission request from a client, the admission request requesting that a set of tasks be executed;

forward the admission request to a local cluster head node for the local cluster in order to have at least one node in the local cluster send resource availability information to the first node, wherein the first node is a member of the local cluster;

receive resource availability information from the at least one node in the local cluster;

attempt to map the set of tasks to at least a subset of the nodes included in the local cluster using the resource availability information received from the at least one node in the local cluster; and if unable to map the set of tasks to the subset of nodes included in the local cluster:

request that the local cluster head node of the local cluster forward the admission request to at least one remote cluster head node of at least one remote cluster included in the wireless network in order to have at least one node in the at least one remote cluster send resource availability information to the first node; and attempt to map the set of tasks to at least a subset of the nodes included in at least one of the first cluster and the at least one remote cluster using the resource availability received from received from the at least one node in at least one of the first cluster and the at least one remote cluster.

24. The software of claim 23, wherein the program instructions are operable to cause the first node to send a commit message to each of the nodes in the wireless network to which at least one of the tasks is mapped.

25. The software of claim 23, wherein the wireless network comprises an ad hoc wireless network.

26. The software of claim 25, wherein the ad hoc wireless network comprises a mobile ad hoc wireless network.

27. The software of claim 23, wherein the plurality of clusters are defined by the topology of the wireless network.

28. The software of claim 23, wherein the plurality of clusters are defined according to a routing protocol.

29. The software of claim 23, wherein each cluster head node is defined by the topology of the wireless network.

30. The software of claim 23, wherein each cluster head node is defined according to a routing protocol.

31. A first node comprising:

means for sending and receiving data over a wireless network;

means for receiving an admission request from a client, the admission request requesting that a set of tasks be executed;

means for forwarding the admission request to a local cluster head node for a local cluster in order to have at least one node in the local cluster send resource availability information to the first node, wherein the first node is a member of the local cluster;

means for receiving resource availability information from the at least one node in the local cluster;

means for attempting to map the set of tasks to at least a subset of the nodes included in the local cluster using the resource availability information received from the at least one node in the local cluster; and means for requesting that the local cluster head node of the local cluster forward the admission request to at least one remote cluster head node of at least one remote cluster included in the wireless network in order to have at least one node in the at least one remote cluster send resource availability information to the first node, if unable to map the set of tasks to the subset of nodes included in the local cluster; and means for attempting to map the set of tasks to at least a subset of the nodes included in at least one of the local cluster and the at least one remote cluster using the resource availability received from the at least one node in at least one of the local cluster and the at least one remote cluster, if unable to map the set of tasks to the subset of nodes included in the local cluster.

* * * * *